(12) United States Patent
Topf et al.

(10) Patent No.: US 11,235,893 B2
(45) Date of Patent: Feb. 1, 2022

(54) END EFFECTOR FOR CLEANING OBJECTS HAVING MULTIPLE SURFACES

(71) Applicant: The Boeing Company, Chicago, IL (US)

(72) Inventors: Richard Philip Topf, Orange, CA (US); Steve Esparza, Inglewood, CA (US); Martin Hanna Guirguis, Long Beach, CA (US); Raul Tomuta, Long Beach, CA (US); Angelica Davancens, Reseda, CA (US); Steven E. Drenth, Cypress, CA (US)

(73) Assignee: The Boeing Company, Chicago, IL (US)

( * ) Notice: Subject to any disclaimer, the term of this patent is extended or adjusted under 35 U.S.C. 154(b) by 1134 days.

(21) Appl. No.: 14/097,845

(22) Filed: Dec. 5, 2013

(65) Prior Publication Data

US 2015/0158601 A1 Jun. 11, 2015

(51) Int. Cl.
*B64F 5/30* (2017.01)
*B60S 3/06* (2006.01)
(Continued)

(52) U.S. Cl.
CPC .................. *B64F 5/30* (2017.01); *B60S 3/06* (2013.01); *B08B 1/002* (2013.01); *B08B 1/04* (2013.01); *B08B 5/04* (2013.01)

(58) Field of Classification Search
CPC .... B64F 5/30; B60S 3/06; B60S 3/063; B60S 3/066; B08B 1/002; B08B 1/04; B08B 5/04
See application file for complete search history.

(56) References Cited

U.S. PATENT DOCUMENTS 969,441 A * 9/1910 Backer ...................... A47L 5/24
132/112
3,439,372 A * 4/1969 Collier .................. B66F 11/046
15/50.1
(Continued)

FOREIGN PATENT DOCUMENTS

CN 202764927 U 3/2013
EP 0541811 A1 5/1993
(Continued)

OTHER PUBLICATIONS

Extended European Search Report, dated May 6, 2015, regarding Application No. EP14196115.1, 7 pages.
(Continued)

*Primary Examiner* — Bryan R Muller
(74) *Attorney, Agent, or Firm* — Yee & Associates, P.C.

(57) ABSTRACT

A method and apparatus for cleaning surfaces of an object. A platform may be moved along a path relative to the object using a robotic device. A liquid may be applied onto the plurality of surfaces of the object using an applicator associated with the platform. The liquid may be worked into the plurality of surfaces using a plurality of cleaning elements associated with the platform to dislodge undesired material from the plurality of surfaces. A plurality of flexible members may be moved along the plurality of surfaces to dry the plurality of surfaces and remove the undesired material from the plurality of surfaces. An airflow may be generated that moves the undesired material into a vacuum duct in a vacuum system.

23 Claims, 24 Drawing Sheets

(51) Int. Cl.
  *B08B 5/04*      (2006.01)
  *B08B 1/04*      (2006.01)
  *B08B 1/00*      (2006.01)

(56) References Cited

U.S. PATENT DOCUMENTS

| | | | | |
|---|---|---|---|---|
| 3,460,177 | A | * | 8/1969 | Rhinehart ................. B08B 1/00 15/50.1 |
| 3,551,934 | A | * | 1/1971 | Franzreb .................... B64F 5/30 15/97.3 |
| 3,601,832 | A | * | 8/1971 | Cook ........................ B64F 5/30 15/141.1 |
| 3,835,498 | A | | 9/1974 | Arato |
| 4,614,002 | A | | 9/1986 | Hata et al. |
| 4,668,301 | A | * | 5/1987 | Takigawa .................. B64F 5/30 134/6 |
| 5,318,254 | A | * | 6/1994 | Shaw ....................... B25J 5/005 239/135 |
| 5,361,443 | A | * | 11/1994 | Belanger ................. B60S 3/063 15/53.3 |
| 5,490,646 | A | * | 2/1996 | Shaw ....................... B25J 5/005 244/134 C |
| 5,525,027 | A | * | 6/1996 | Jinno ....................... B25J 5/007 114/222 |
| 5,666,689 | A | * | 9/1997 | Andersen .............. A47L 11/302 15/349 |
| 5,979,001 | A | * | 11/1999 | Marrero .................... B60S 3/00 15/53.1 |
| 6,134,734 | A | * | 10/2000 | Marrero .................... B60S 3/00 15/53.1 |

| | | | | |
|---|---|---|---|---|
| 2004/0221420 | A1 | | 11/2004 | Phillips |
| 2007/0016328 | A1 | | 1/2007 | Ziegler et al. |
| 2008/0119531 | A1 | | 9/2008 | Takida |
| 2009/0126143 | A1 | | 5/2009 | Haegermarck |
| 2010/0258146 | A1 | * | 10/2010 | Villard ................... A46B 17/06 134/34 |

FOREIGN PATENT DOCUMENTS

| | | |
|---|---|---|
| EP | 1928286 B1 | 6/2008 |
| EP | 2494900 A1 | 9/2012 |
| EP | 2604163 A2 | 6/2013 |
| WO | 9423159 A1 | 10/1994 |
| WO | 0141617 A1 | 6/2001 |

OTHER PUBLICATIONS

European Patent Office Examination Report, dated Jan. 10, 2018, regarding Application No. 14196115.1, 3 pages.
State Intellectual Property Office of the PRC Notification of First Office Action, dated Dec. 22, 2017, regarding Application No. 201410729869, 26 pages.
State Intellectual Property Office of the People's Republic of China Notification of the Second Office Action with English Translation, dated Aug. 29, 2018, regarding Application No. 201410729869.X, 43 pages.
State Intellectual Property Office of the PRC Notification of First Office Action, dated May 19, 2021, regarding Application No. 2019107883130, 11 pages.

* cited by examiner

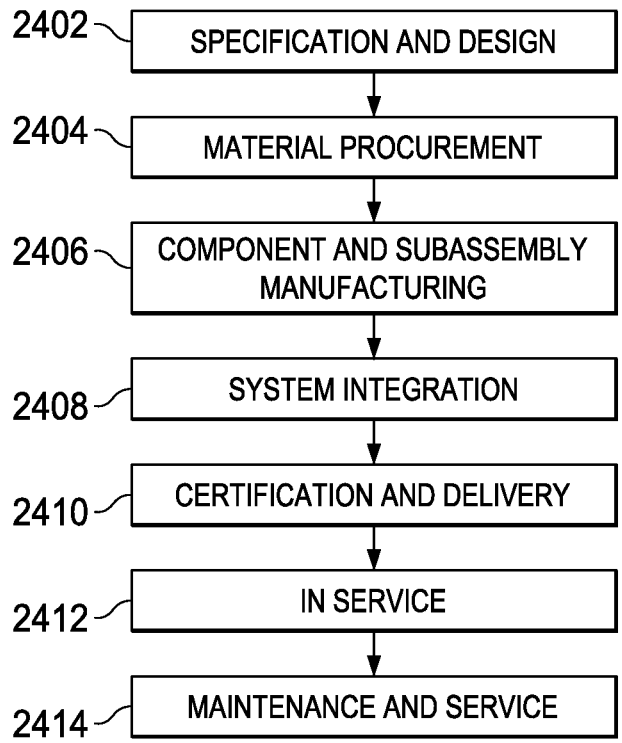
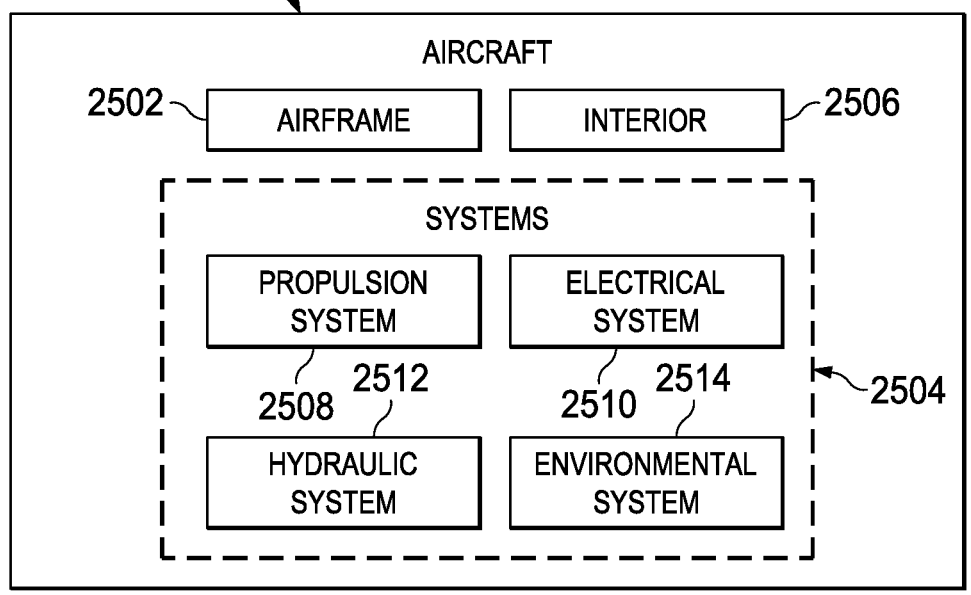

END EFFECTOR FOR CLEANING OBJECTS HAVING MULTIPLE SURFACES

BACKGROUND INFORMATION

1. Field

The present disclosure relates generally to cleaning systems and, in particular, to robotic devices in cleaning systems. Still more particularly, the present disclosure relates to a method and apparatus for cleaning surfaces of an object with an end effector.

2. Background

During the manufacturing of an object, various components that make up the object may need to be cleaned. As one illustrative example, during the assembly of a wing for an aircraft, different wing panels that form the wing may need to be cleaned. Typically, this cleaning is performed manually. However, manual cleaning of the wing panels may be more time-consuming and labor intensive than desired. In some cases, this type of manual cleaning may be more expensive than desired.

For example, a human operator may clean a wing panel by hand using a handheld cleaning tool. The handheld cleaning tool may take the form of, for example, without limitation, a sponge, a brush, a piece of fabric, or some other type of tool. The amount of time and effort needed to clean all of the wing panels that are used to form the wing of the aircraft using this handheld tool may be greater than desired.

Further, different types of cleaning liquids may be used to clean different types of objects. For example, a cleaning liquid may be sprayed onto the surface of an object. A handheld cleaning tool may then be used to work the cleaning liquid into the surface of the object. Spraying a fluid such as a cleaning liquid, as used herein, means dispersing the fluid as a collection of drops. The drops may take the form of liquid drops or gas drops, depending on the implementation.

In some cases, spraying may be the preferred method of applying the cleaning liquid on an object. However, in other cases, spraying a cleaning liquid may have undesirable effects. For example, with certain types of cleaning liquids, spraying the cleaning liquids may release undesired particles into the environment. Further, with certain types of cleaning liquids, the particles released into the environment by spraying may pose health and safety concerns. Therefore, it would be desirable to have a method and apparatus that take into account at least some of the issues discussed above, as well as other possible issues.

SUMMARY

In one illustrative embodiment, an apparatus may comprise a platform, a robotic interface associated with the platform, a first set of cleaning elements associated with the platform, a second set of cleaning elements associated with the platform, and a vacuum system associated with the platform. The robotic interface may be configured for attachment to a robotic device. The robotic device may be configured to move the platform along a path relative to an aircraft structure. The first set of cleaning elements may be configured to clean a first surface of the aircraft structure using a liquid as the platform is moved along the path. The second set of cleaning elements may be configured to clean a second surface of the aircraft structure using the liquid as the platform is moved along the path. The second surface may be angled relative to the first surface. The vacuum system may be configured to dry the first surface and the second surface. The vacuum system may remove undesired material from the first surface and the second surface as the platform is moved along the path.

In another illustrative embodiment, an end effector may comprise a platform, a robotic interface associated with the platform, an applicator associated with the platform, a plurality of cleaning elements, a motor system, and a vacuum system. The robotic interface may be configured to attach the platform to a robotic device. The robotic device may be configured to move the platform along a path relative to an object. The applicator may be configured to apply a liquid onto a plurality of surfaces of the object as the platform is moved along the path. The plurality of cleaning elements may comprise a first set of brushes, a second set of brushes, and a third set of brushes. The first set of brushes may be configured to clean a first surface in the plurality of surfaces. The second set of brushes may be configured to clean a second surface in the plurality of surfaces. The third set of brushes may be configured to clean a third surface in the plurality of surfaces. The motor system may be configured to move a cleaning element in the plurality of cleaning elements back and forth along a surface in the plurality of surfaces multiple times as the platform is moved along the path. The vacuum system may be configured to dry the plurality of surfaces. The vacuum system may be further configured to remove undesired material from the plurality of surfaces as the platform is moved along the path relative to the object.

In yet another illustrative embodiment, a method for cleaning an aircraft structure may be provided. A platform may be moved along a path relative to the aircraft structure using a robotic device. A first surface of the aircraft structure may be cleaned using a liquid and a first set of cleaning elements as the platform is moved along the path. A second surface of the aircraft structure may be cleaned using the liquid and a second set of cleaning elements as the platform is moved along the path. The second surface may be angled relative to the first surface. Undesired material may be removed from the first surface and the second surface using a vacuum system associated with the platform as the platform is moved along the path.

In still another illustrative embodiment, a method for cleaning a plurality of surfaces of an object may be provided. A platform may be moved along a path relative to the object using a robotic device. A liquid may be applied onto the plurality of surfaces of the object using an applicator associated with the platform. The liquid may be worked into the plurality of surfaces using a plurality of cleaning elements associated with the platform to dislodge undesired material from the plurality of surfaces. A plurality of flexible members may be moved along the plurality of surfaces to dry the plurality of surfaces and remove the undesired material from the plurality of surfaces. An airflow may be generated that moves the undesired material into a vacuum duct in a vacuum system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 24 is an illustration of an aircraft manufacturing and service method in the form of a block diagram in accordance with an illustrative embodiment; and FIG. 25 is an illustration of an aircraft in the form of a block diagram in which an illustrative embodiment may be implemented.

DETAILED DESCRIPTION

The illustrative embodiments recognize and take into account different considerations. For example, the illustrative embodiments recognize and take into account that it may be desirable to have an end effector capable of applying a cleaning liquid onto a surface without spraying the cleaning liquid onto the surface. The end effector may be a robotic end effector configured for attachment to a robotic device, such as, for example, without limitation, a robotic arm.

In particular, the illustrative embodiments recognize and take into account that application of a cleaning liquid onto a surface using, for example, without limitation, a sponge, to apply a cleaning liquid onto a surface may reduce the number of undesired environmental effects associated with spraying cleaning liquids. Further, using a sponge may allow the amount of cleaning liquid used and the area on the surface on which the cleaning liquid is applied to be better controlled as compared to spraying the cleaning liquid onto the surface.

Further, the illustrative embodiments recognize and take into account that it may be desirable to have a robotic end effector capable of cleaning an object having multiple surfaces. In particular, the illustrative embodiments recognize and take into account that it may be desirable to have an end effector that can clean multiple surfaces while moving along a particular path. Additionally, the illustrative embodiments recognize and take into account that using the same end effector to remove the cleaning liquid from these multiple surfaces while the end effector moves along the particular path may reduce the overall time needed for cleaning the object.

Thus, the illustrative embodiments provide a method and apparatus for cleaning a plurality of surfaces of an object. In one illustrative embodiment, a method may be provided for moving a platform along a path relative to the object using a robotic device. The plurality of surfaces may be cleaned using a liquid and a plurality of cleaning elements associated with the platform as the platform is moved along the path relative to the object. Further, substantially all of the liquid may be removed from the plurality of surfaces using a vacuum system as the platform is moved along the path relative to the object.

Figure 1:
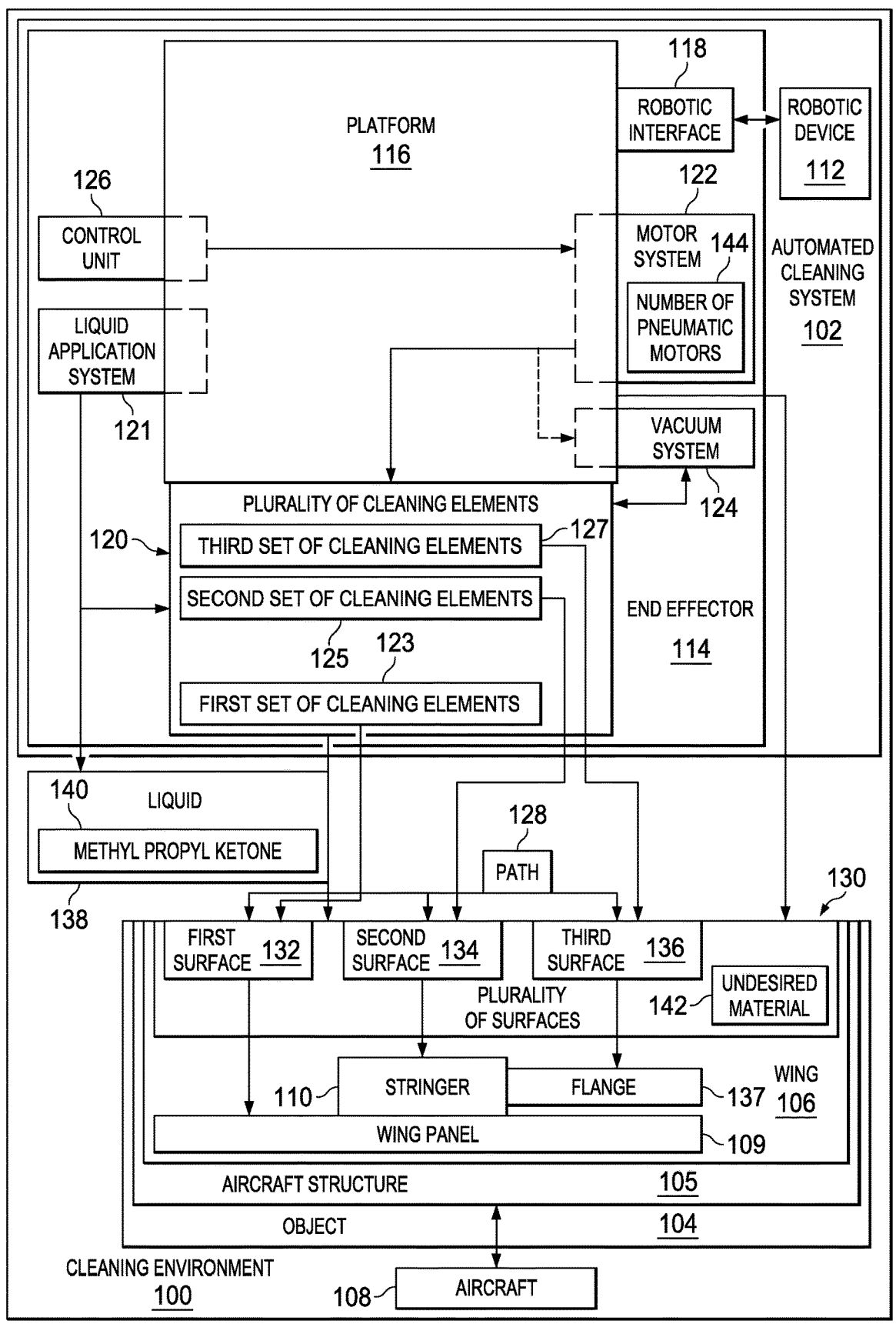
FIG. 1 is an illustration of a cleaning environment in the form of a block diagram in accordance with an illustrative embodiment.

Referring now to the figures and, in particular, with reference to FIG. 1, an illustration of a cleaning environment is depicted in the form of a block diagram in accordance with an illustrative embodiment. In this illustrative example, cleaning environment 100 may be an example of an environment in which automated cleaning system 102 may be used to clean object 104. Cleaning environment 100 may be located within, for example, without limitation, a manufacturing plant, an assembly facility, a factory, or some other type of environment in which objects are cleaned.

Automated cleaning system 102 may be a cleaning system that does not require a human operator to be operated. In this illustrative example, all operations performed by automated cleaning system 102 may be controlled and performed without a human operator. For example, automated cleaning system 102 may be operable using robotic machines or robotic devices.

Object 104 may take a number of different forms. In one illustrative example, object 104 may take the form of aircraft structure 105. In one illustrative example, aircraft structure 105 may take the form of wing 106 of aircraft 108. Wing 106 may include wing panel 109 and stringer 110 attached to wing panel 109. Automated cleaning system 102 may be used to clean wing panel 109 and stringer 110 of wing 106 during the manufacturing of wing 106.

In this illustrative example, automated cleaning system 102 may include robotic device 112 and end effector 114. Robotic device 112 may take a number of different forms. For example, without limitation, robotic device 112 may take the form of a robotic arm, a robotic operator, or some other type of robotic device or system.

As depicted, end effector 114 may include platform 116, robotic interface 118, plurality of cleaning elements 120, liquid application system 121, motor system 122, vacuum system 124, and control unit 126. Robotic interface 118, plurality of cleaning elements 120, liquid application system 121, motor system 122, vacuum system 124, and control unit 126 may be associated with platform 116. As used herein, when one component is "associated" with another component, the association is a physical association in the depicted examples.

For example, a first component, such as robotic interface 118, may be considered to be associated with a second component, such as platform 116, by being at least one of secured to the second component, bonded to the second component, mounted to the second component, welded to the second component, fastened to the second component, or connected to the second component in some other suitable manner. The first component also may be connected to the second component using a third component. Further, the first component may be considered to be associated with the second component by being formed as part of the second component, an extension of the second component, or both.

Platform 116 may be a structural body or base configured to support the various components of end effector 114. Further, platform 116 may house one or more components that make up end effector 114. For example, platform 116 may house control unit 126, at least a portion of motor system 122, at least a portion of vacuum system 124, or some combination thereof.

In this illustrative example, robotic interface 118 may be configured to attach platform 116 to robotic device 112. Once platform 116 is attached to robotic device 112, robotic device 112 may be used to move platform 116. As depicted, robotic device 112 may move platform 116 along path 128 relative to object 104. Path 128 may be on object 104 or adjacent to object 104 depending on the implementation. Path 128 may be selected based on the particular portion of object 104 to be cleaned.

Plurality of cleaning elements 120 may be configured to clean plurality of surfaces 130 of object 104 as platform 116 of end effector 114 is moved along path 128. For example, without limitation, plurality of surfaces 130 may be surfaces that have been sealed. In particular, plurality of surfaces 130 may have been sealed using sealant materials, paint materials, other materials, or some combination thereof to prevent fluids, including liquids and gases, from entering any pores that may be present in object 104.

During manufacturing processes, including assembly and fabrication processes, different types of substances may be used on plurality of surfaces 130. These substances may include, for example, without limitation, oils, cutting oils, waxes, adhesive materials, sealant materials, glue, other types of substances, or some combination thereof. In some cases, undesired solid matter such as, for example, without limitation, metal chips, metal particles, other types of solid matter, or some combination thereof, may become attached to plurality of surfaces 130 of object 104 by these substances. These substances and undesired solid matter may form undesired material 142 that may need to be removed from plurality of surfaces 130. Thus, cleaning plurality of surfaces 130 may include removing undesired material 142 from plurality of surfaces 130.

In one illustrative example, plurality of surfaces 130 may include first surface 132 and second surface 134. In one illustrative example, second surface 134 may be substantially perpendicular to first surface 132. However, in other illustrative examples, second surface 134 may be at an angle less than or greater than about 90 degrees relative to first surface 132.

In some cases, plurality of surfaces 130 may include third surface 136. In one illustrative example, third surface 136 may be substantially parallel to first surface 132 and thus, substantially perpendicular to second surface 134. But in other illustrative examples, third surface 136 may be at an angle less than or greater than about 90 degrees relative to second surface 134.

When object 104 takes the form of wing 106, first surface 132 may be the surface of wing panel 109 configured to face the inside of wing 106. In other words, first surface 132 may be the inner surface of wing panel 109. Second surface 134 may be a surface of stringer 110 attached to wing panel 109. Third surface 136 may be a surface of flange 137 associated with stringer 110.

Plurality of cleaning elements 120 may use liquid 138 to clean plurality of surfaces 130. In one illustrative example, liquid 138 may take the form of methyl propyl ketone (MPK) 140. Of course, in other illustrative examples, liquid 138 may take some other form such as, for example, without limitation, acetone, another type of ketone, or some other type of liquid or solvent used for cleaning.

Liquid 138 may be applied onto plurality of surfaces 130 using liquid application system 121. Liquid application system 121 may be configured to dispense and apply liquid 138 onto plurality of surfaces 130 while platform 116 is moved along path 128. Once liquid 138 has been applied to plurality of surfaces 130, plurality of cleaning elements 120 may then be used to work liquid 138 into plurality of surfaces 130 while platform 116 is moved along path 128.

Working liquid 138 into plurality of surfaces 130 may mean pressing, brushing, or scrubbing liquid 138 into plurality of surfaces 130 to remove or dislodge undesired material 142 from plurality of surfaces 130. Liquid 138 may act as a solvent such that working liquid 138 into plurality of surfaces 130 dissolves substances including, but not limited to, cutting oils and waxes, in liquid 138. Dissolving these substances dislodges any undesired solid matter attached to plurality of surfaces 130 by these substances.

Thus, working liquid 138 may allow the portion of undesired material 142 formed by these substances and undesired solid matter to be removed from plurality of surfaces 130. In other illustrative examples, liquid 138 may be able to dissolve undesired substances on plurality of surfaces 130 without being worked into plurality of surfaces 130.

Motor system 122 may be operated to move plurality of cleaning elements 120 relative to plurality of surfaces 130 in a manner that works liquid 138 into plurality of surfaces 130 and dislodge undesired material 142 from plurality of surfaces 130. Plurality of cleaning elements 120 may include first set of cleaning elements 123 for cleaning first surface 132 and second set of cleaning elements 125 for cleaning second surface 134. Depending on the implementation, plurality of cleaning elements 120 may also include third set of cleaning elements 127 for cleaning third surface 136.

In one illustrative example, motor system 122 may be comprised of number of pneumatic motors 144. As used herein, a "number of" items may include one or more items. For example, number of pneumatic motors 144 may include one or more pneumatic motors. A pneumatic motor, such as one of number of pneumatic motors 144, may also be referred to as an air motor in some illustrative examples. Pneumatic motors 144 may be used to reduce or prevent sparks from being created during the operation of motor system 122. In some illustrative examples, motor system 122 may be configured to move at least one cleaning element in plurality of cleaning elements 120 back and forth along a surface in plurality of surfaces 130 as platform 116 is moved along path 128.

While platform 116 moves along path 128, vacuum system 124 may be used to remove liquid 138 from plurality of surfaces 130 such that any remaining liquid 138, if any, on plurality of surfaces 130 is within selected tolerances. Vacuum system 124 may also be used to remove undesired material 142 that has been dislodged from plurality of surfaces 130.

In this illustrative example, control unit 126 may be used to control the operation of motor system 122, vacuum system 124, liquid application system 121, or some combination thereof. Control unit 126 may take the form of a computer, a microchip, a processor unit, a microprocessor, or some other type of hardware device. As described above, control unit 126 may be housed within platform 116. However, in some illustrative examples, control unit 126 may be attached to the exterior of platform 116.

Thus, as described above, cleaning a surface, such as first surface 132, second surface 134, or third surface 136, may include applying liquid 138 onto the surface, working liquid 138 into the surface, drying the surface, and removing undesired material 142 from the surface, or some combination thereof. These operations may be performed in a number of different ways depending on the configuration of end effector 114. Examples of configurations for end effector 114 may be depicted in FIG. 2, described below.

Figure 2:
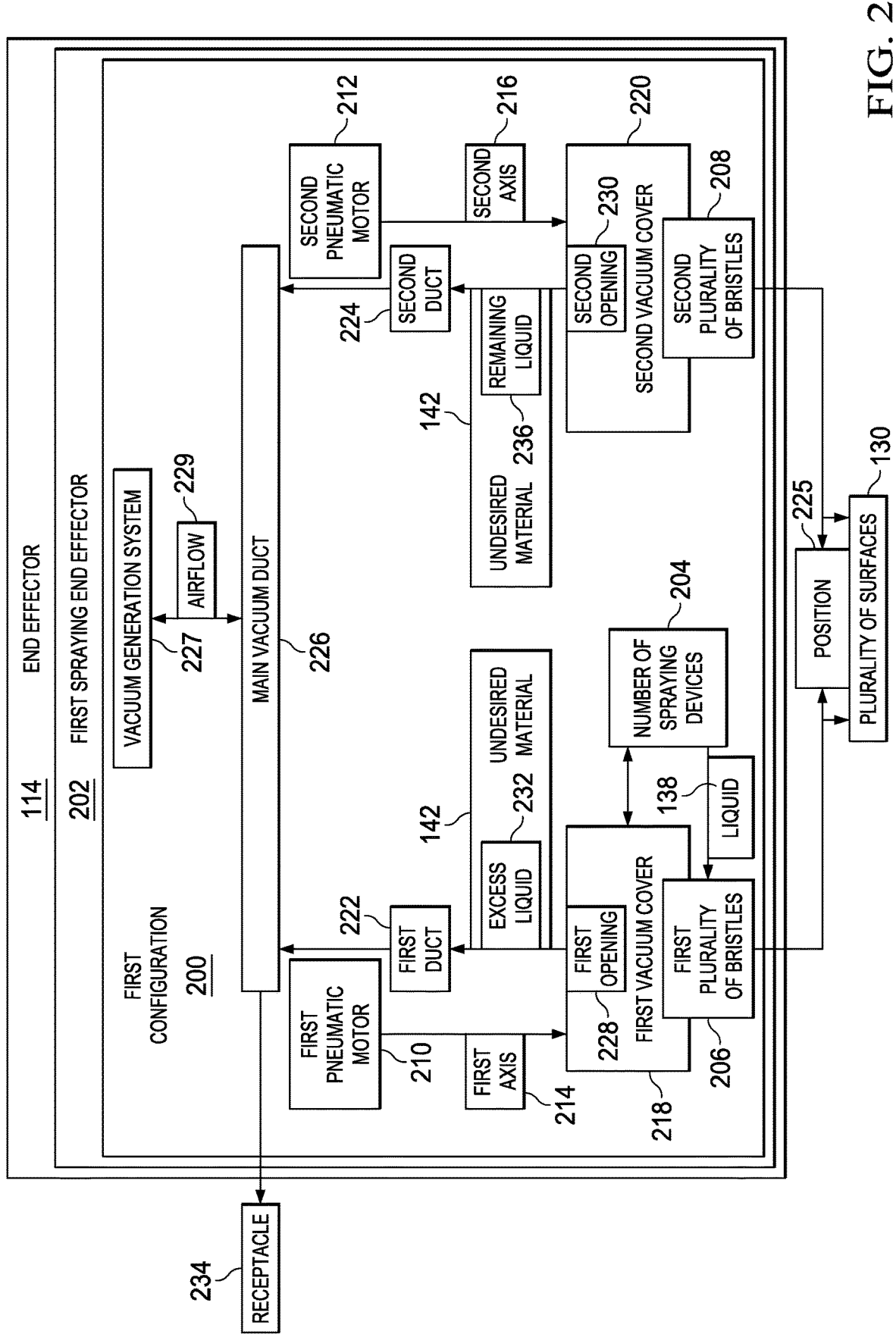
FIG. 2 is an illustration of a first configuration for an end effector in the form of a block diagram in accordance with an illustrative embodiment.

With reference now to FIG. 2, an illustration of a first configuration for end effector 114 from FIG. 1 is depicted in the form of a block diagram in accordance with an illustrative embodiment. In this illustrative example, end effector 114 may be implemented using first configuration 200. When end effector 114 has first configuration 200, end effector 114 may be referred to as first spraying end effector 202.

First configuration 200 for end effector 114 may include first plurality of bristles 206 and second plurality of bristles 208. First plurality of bristles 206 and second plurality of bristles 208 may be an example of one implementation for plurality of cleaning elements 120 in FIG. 1.

First configuration 200 for end effector 114 may also include number of spraying devices 204. Number of spraying devices 204 may be part of liquid application system 121 in FIG. 1.

Number of spraying devices 204 may be used to spray liquid 138 such that liquid 138 contacts first plurality of bristles 206. Platform 116 may be moved along path 128 in FIG. 1 such that first plurality of bristles 206 contacts plurality of surfaces 130. Further, platform 116 may be moved along path 128 in FIG. 1 such that second plurality of bristles 208 follows first plurality of bristles 206 along path 128.

Further, first configuration 200 for end effector 114 may include first pneumatic motor 210 and second pneumatic motor 212. First pneumatic motor 210 and second pneumatic motor 212 may be an example of one implementation for number of pneumatic motors 144 in FIG. 1.

First pneumatic motor 210 may be operated to move first plurality of bristles 206. In particular, first pneumatic motor 210 may be operated to rotate first plurality of bristles 206 about first axis 214. First axis 214 may be a center axis through first plurality of bristles 206. Second pneumatic motor 212 may be operated to move second plurality of bristles 208. In particular, second pneumatic motor 212 may be operated to rotate second plurality of bristles 208 about second axis 216.

First plurality of bristles 206 may be rotated about first axis 214 while first plurality of bristles 206 is in contact with plurality of surfaces 130 to apply liquid 138 onto plurality of surfaces 130 and clean plurality of surfaces 130. In some cases, first plurality of bristles 206 may be referred to as a plurality of application bristles because first plurality of bristles 206 is used to apply liquid 138 onto surfaces.

In one illustrative example, platform 116 may be moved along path 128 in FIG. 1 such that first plurality of bristles 206 is moved to position 225 relative to plurality of surfaces 130. Rotation of first plurality of bristles 206 while first plurality of bristles 206 is at position 225 causes at least a portion of liquid 138 sprayed from number of spraying devices 204 to be applied onto a corresponding portion of plurality of surfaces 130. Further, this corresponding portion of plurality of surfaces 130 may be cleaned using first plurality of bristles 206 and the portion of liquid 138 applied.

Because first plurality of bristles 206 is used to apply liquid 138 onto plurality of surfaces 130, first plurality of bristles 206 may also be considered a part of liquid application system 121 in FIG. 1. Liquid application system 121 may also include other components not shown in this example.

Platform 116 may be moved along path 128 in FIG. 1 such that first plurality of bristles 206 then moves to a new position relative to plurality of surfaces 130 and second plurality of bristles 208 moves into position 225 relative to plurality of surfaces 130. Liquid 138 sprayed by number of spraying devices 204 may not contact second plurality of bristles 208.

Second plurality of bristles 208 may be rotated about second axis 216 to dry the portion of plurality of surfaces 130 corresponding to position 225. Thus, in some cases, second plurality of bristles 208 may be referred to as a plurality of drying bristles.

As depicted, first configuration 200 may also include first vacuum cover 218, second vacuum cover 220, first duct 222, second duct 224, main vacuum duct 226, and vacuum generation system 227. First vacuum cover 218, second vacuum cover 220, first duct 222, second duct 224, main vacuum duct 226, and vacuum generation system 227 may be an example of one implementation for vacuum system 124 in FIG. 1.

Number of spraying devices 204 may be associated with first vacuum cover 218. Number of spraying devices 204 may be configured to spray liquid 138 under first vacuum cover 218 towards first plurality of bristles 206.

First vacuum cover 218 may have first opening 228. Second vacuum cover 220 may have second opening 230. Vacuum generation system 227 may generate airflow 229 that causes air to move through first opening 228 of first vacuum cover 218 into first duct 222 and from first duct 222 into main vacuum duct 226. Further, airflow 229 may cause air to move through second opening 230 of second vacuum cover 220 into second duct 224 and from second duct 224 into main vacuum duct 226.

First vacuum cover 218 may be associated with first plurality of bristles 206, while second vacuum cover 220 may be associated with second plurality of bristles 208. First vacuum cover 218 may be used to remove undesired material 142 from first plurality of bristles 206.

Undesired material 142 may include liquid 232, as well as any particles or materials dislodged from plurality of surfaces 130 during the cleaning of plurality of surfaces 130. Excess liquid 232 may be the portion of liquid 138 sprayed from number of spraying devices 204 that is not applied onto plurality of surfaces 130.

Because of airflow 229 created by vacuum generation system 227, undesired material 142 may travel through first opening 228 in first vacuum cover 218 into first duct 222. Once undesired material 142 reaches main vacuum duct 226, undesired material 142 may be moved into receptacle 234 attached to main vacuum duct 226.

Receptacle 234 may be considered separate from end effector 114 in this illustrative example. However, in other illustrative examples, receptacle 234 may be considered part of end effector 114. Receptacle 234 may take the form of, for example, without limitation, a bag, a container, a tank, or some other type of retaining structure.

Second vacuum cover 220 may be used to remove undesired material 142 from second plurality of bristles 208. Undesired material 142 may include remaining liquid 236, as well as any other particles or materials dislodged from plurality of surfaces 130 during the cleaning of plurality of surfaces 130. Remaining liquid 236 may be the portion of liquid 138 remaining on plurality of surfaces 130 after being cleaned by first plurality of bristles 206.

Undesired material 142 may travel through second opening 230 in second vacuum cover 220 into second duct 224. Once undesired material 142 reaches main vacuum duct 226, undesired material 142 may be moved into receptacle 234 attached to main vacuum duct 226.

Figure 3:
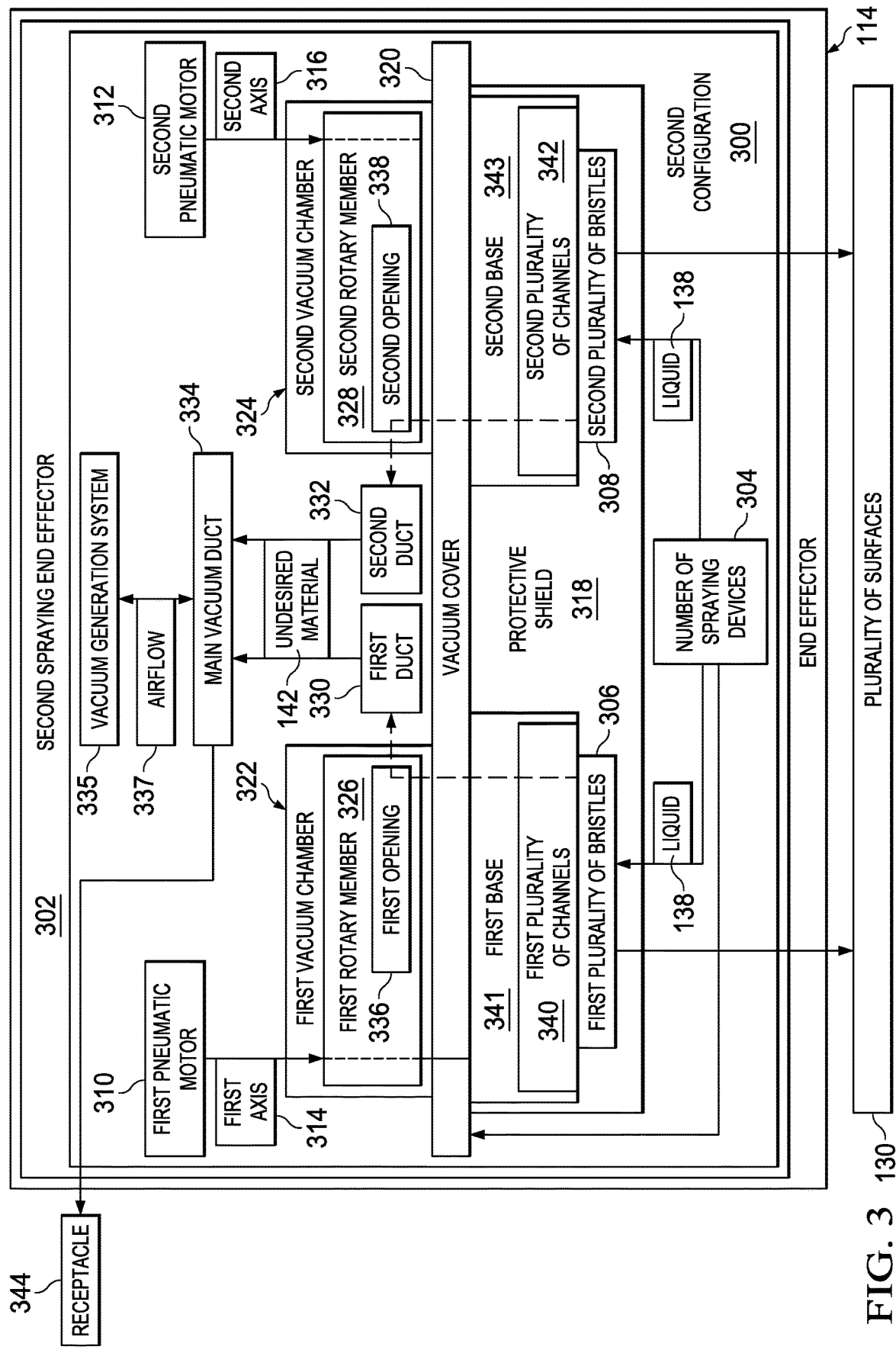
FIG. 3 is an illustration of a second configuration for an end effector in the form of a block diagram in accordance with an illustrative embodiment.

With reference now to FIG. 3, an illustration of a second configuration for end effector 114 from FIG. 1 is depicted in the form of a block diagram in accordance with an illustrative embodiment. In this illustrative example, end effector 114 may be implemented using second configuration 300. When end effector 114 has second configuration 300, end effector 114 may be referred to as second spraying end effector 302.

Second configuration 300 for end effector 114 may include first plurality of bristles 306 and second plurality of bristles 308. First plurality of bristles 306 and second plurality of bristles 308 may be an example of one implementation for plurality of cleaning elements 120 in FIG. 1.

Second configuration 300 for end effector 114 may also include number of spraying devices 304. Number of spraying devices 304 may be used to spray liquid 138 such that liquid 138 contacts first plurality of bristles 306 and second plurality of bristles 308. Number of spraying devices 304 may be part of liquid application system 121 in FIG. 1.

Platform 116 may be moved along path 128 in FIG. 1 such that first plurality of bristles 306 and second plurality of bristles 308 contact plurality of surfaces 130. In particular, platform 116 may be moved along path 128 in FIG. 1 such that second plurality of bristles 308 follows first plurality of bristles 306 along path 128.

Additionally, second configuration 300 for end effector 114 may include first pneumatic motor 310 and second pneumatic motor 312. First pneumatic motor 310 and second pneumatic motor 312 may be an example of one implementation for number of pneumatic motors 144 in FIG. 1.

First pneumatic motor 310 may be operated to move first plurality of bristles 306. In particular, first pneumatic motor 310 may be operated to rotate first plurality of bristles 306 about first axis 314. First axis 314 may be a center axis through first plurality of bristles 306. Second pneumatic motor 312 may be operated to move second plurality of bristles 308. In particular, second pneumatic motor 312 may be operated to rotate second plurality of bristles 308 about second axis 316.

First plurality of bristles 306 may be rotated about first axis 314 while first plurality of bristles 306 is in contact with plurality of surfaces 130 to apply liquid 138 onto plurality of surfaces 130 and clean plurality of surfaces 130. Second plurality of bristles 308 may be rotated about second axis 316 to apply liquid 138 onto plurality of surfaces 130 to clean plurality of surfaces 130.

Because first plurality of bristles 306 is used to apply liquid 138 onto plurality of surfaces 130, first plurality of bristles 306 may also be considered part of liquid application system 121 in FIG. 1. Liquid application system 121 may also include other components not shown in this example.

Protective shield 318 may be used to prevent liquid 138 from splattering during the application of liquid 138. Protective shield 318 may enclose first plurality of bristles 306 and second plurality of bristles 308 such that liquid 138 is only applied to and used to clean the portion of plurality of surfaces 130 in contact with or around first plurality of bristles 306 and second plurality of bristles 308.

As depicted, second configuration 300 may also include vacuum cover 320, first vacuum chamber 322, second vacuum chamber 324, first duct 330, second duct 332, main vacuum duct 334, and vacuum generation system 335. Vacuum cover 320, first vacuum chamber 322, second vacuum chamber 324, first duct 330, second duct 332, main vacuum duct 334, and vacuum generation system 335 may be an example of one implementation for vacuum system 124 in FIG. 1.

Vacuum cover 320 may be associated with first plurality of bristles 306, second plurality of bristles 308, and protective shield 318. Protective shield 318 may extend from vacuum cover 320 to surround first plurality of bristles 306 and second plurality of bristles 308.

First vacuum chamber 322 and second vacuum chamber 324 may be associated with vacuum cover 320. First rotary member 326 may be located within first vacuum chamber 322. Second rotary member 328 may be located within second vacuum chamber 324.

First rotary member 326 may be associated with first base 341, and second rotary member 328 may be associated with second base 343. First plurality of bristles 306 may be configured to extend from first base 341. Second plurality of bristles 308 may be configured to extend from second base 343.

Operation of first pneumatic motor 310 may be configured to rotate first rotary member 326 and thereby, first base 341 about first axis 314. Rotation of first base 341 about first axis 314, in turn, may cause first plurality of bristles 306 to rotate about first axis 314. Operation of second pneumatic motor 312 may be configured to rotate second rotary member 328 and thereby, second base 343 about second axis 316. Rotation of second base 343 about second axis 316, in turn, may cause second plurality of bristles 308 to rotate about second axis 316.

First base 341 may have first plurality of channels 340. Second base 343 may have second plurality of channels 342. First rotary member 326 and second rotary member 328 may have first opening 336 and second opening 338, respectively.

First plurality of channels 340 may be connected to first opening 336 in first rotary member 326 such that air flowing through first plurality of channels 340 may flow through first opening 336. Second plurality of channels 342 may be connected to second opening 338 in second rotary member 328 such that air flowing through second plurality of channels 342 may flow through second opening 338.

Vacuum generation system 335 may generate airflow 337 that causes air to move through first plurality of channels 340, through first opening 336 in first rotary member 326, and into first duct 330. Further, airflow 337 may cause air to move through second plurality of channels 342, into second opening 338 in second rotary member 328, and into second duct 332.

Airflow 337 may cause air in first duct 330 and second duct 332 to be moved into main vacuum duct 334 and then receptacle 344. Undesired material 142 may be removed from plurality of surfaces 130 during the cleaning of plurality of surfaces 130 by airflow 337 created by vacuum generation system 335. Undesired material 142 may be removed from plurality of surfaces 130 and moved into receptacle 344 in a manner similar to the manner in which undesired material 142 is moved into receptacle 234 in FIG. 2.

Figure 4:
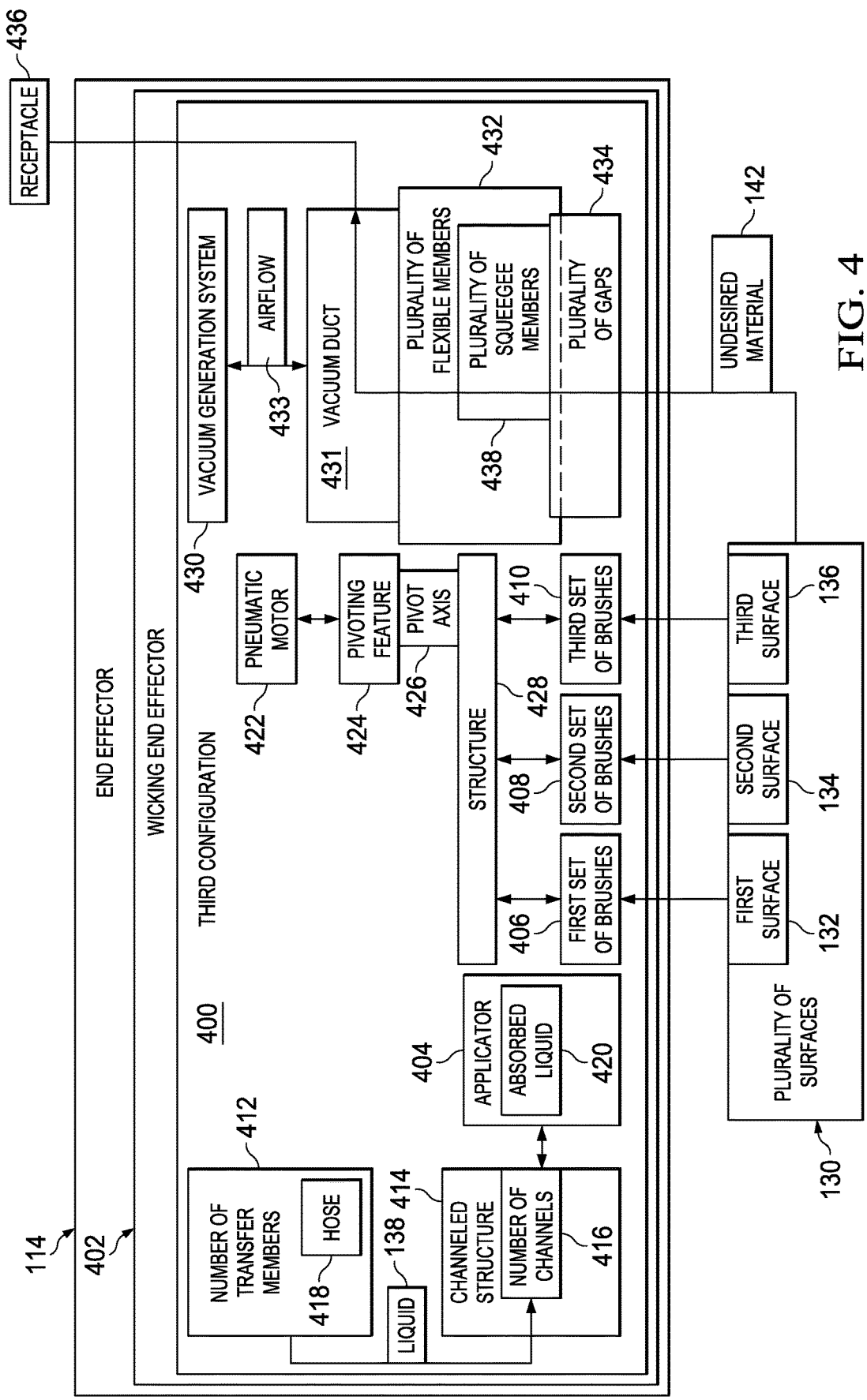
FIG. 4 is an illustration of a third configuration for an end effector in the form of a block diagram in accordance with an illustrative embodiment.

With reference now to FIG. 4, an illustration of a third configuration for end effector 114 from FIG. 1 is depicted in the form of a block diagram in accordance with an illustrative embodiment. In this illustrative example, end effector 114 may be implemented using third configuration 400. When end effector 114 has third configuration 400, end effector 114 may be referred to as wicking end effector 402.

Third configuration 400 may include applicator 404, first set of brushes 406, second set of brushes 408, and third set of brushes 410. As used herein, a "set of" items may include one or more items. In this manner, each of first set of brushes 406, second set of brushes 408, and third set of brushes 410 may include one or more brushes. First set of brushes 406, second set of brushes 408, and third set of brushes 410 may be an example of one implementation for plurality of cleaning elements 120 in FIG. 1.

Applicator 404 may be used to apply liquid 138 onto plurality of surfaces 130. First set of brushes 406, second set of brushes 408, and third set of brushes 410 may be used to clean plurality of surfaces 130 using liquid 138 that has been applied onto plurality of surfaces 130.

Third configuration 400 may also include number of transfer members 412 and channeled structure 414. Number of transfer members 412 may be used to transfer liquid 138 from a source of liquid 138 to number of channels 416 in channeled structure 414. A transfer member in number of transfer members 412 may take the form of, for example, without limitation, hose 418.

Number of channels 416 may be used to deliver liquid 138 to applicator 404. Applicator 404 may be configured to absorb liquid 138 from number of channels 416 by capillary action. Capillary action is the movement of a liquid, such as liquid 138, towards a solid, such as applicator 404, caused by an attraction of the molecules of the liquid to the molecules of the solid. Capillary action may also be referred to as wicking. Capillary action may also allow liquid 138 to move through applicator 404 towards the portion of applicator 404 in contact with plurality of surfaces 130.

The portion of liquid 138 absorbed by applicator 404 may be absorbed liquid 420. Applicator 404 may be moved along path 128 in FIG. 1 relative to plurality of surfaces 130 to apply at least a portion of absorbed liquid 420 onto plurality of surfaces 130 as applicator 404 is moved along path 128 in FIG. 1.

Channeled structure 414 may also function as a protective shield, in a manner similar to protective shield 318 in FIG. 3. Channeled structure 414 may provide a shield to protect against any splattering of liquid 138 during the application of liquid 138 by applicator 404.

First set of brushes 406, second set of brushes 408, and third set of brushes 410 may follow applicator 404 along path 128 in FIG. 1. First set of brushes 406, second set of brushes 408, and third set of brushes 410 may be moved by pneumatic motor 422 of end effector 114 to clean plurality of surfaces 130 using the portion of absorbed liquid 420 applied onto plurality of surfaces 130.

Pneumatic motor 422 may be configured to rotate pivoting feature 424 about pivot axis 426. Pivoting feature 424 may be movably connected to structure 428. First set of brushes 406, second set of brushes 408, and third set of brushes 410 may be attached to structure 428. Rotation of pivoting feature 424 about pivot axis 426 may cause movement of structure 428, which may, in turn, cause movement of first set of brushes 406, second set of brushes 408, and third set of brushes 410.

First set of brushes 406, second set of brushes 408, and third set of brushes 410 may be moved in a reciprocating manner to clean first surface 132, second surface 134, and third surface 136, respectively. Moving an item, such as first set of brushes 406, in a reciprocating manner may mean moving the item back and forth multiple times.

In this illustrative example, third configuration 400 may also include vacuum generation system 430, vacuum duct 431, and plurality of flexible members 432. Vacuum generation system 430 may be configured to generate airflow 433 that is used to remove undesired material 142 from plurality of surfaces 130. In particular, airflow 433 may cause undesired material 142 to move through plurality of gaps 434 between plurality of flexible members 432 and into vacuum duct 431. Undesired material 142 may then move from vacuum duct 431 into receptacle 436.

Plurality of flexible members 432 may be moved along path 128 in FIG. 1 relative to plurality of surfaces 130 to wipe and dry plurality of surfaces 130 after plurality of surfaces 130 have been cleaned. The vacuum pressure created by vacuum generation system 430 may ensure that all undesired material 142, including any remaining liquid or other types of materials, may be removed. Further, the vacuum pressure created by vacuum generation system 430 may also help plurality of flexible members 432 maintain sufficient contact with plurality of surfaces 130 to properly dry plurality of surfaces 130.

In one illustrative example, plurality of flexible members 432 may take the form of plurality of squeegee members 438. A squeegee member may also be referred to as a squeegee or a squimjim.

Thus, in this manner, end effector 114 in FIG. 1 and, in particular, the different configurations for end effector 114 described in FIGS. 2-4 may be used to clean the surfaces of different types of objects in a manner that reduces the overall time needed for cleaning. Further, the different components of end effector 114 in FIGS. 1-4 may be comprised of materials selected such that the materials are compatible with liquid 138. In other words, the materials may be selected to prevent any adverse or undesired reactions between the materials and liquid 138.

Additionally, third configuration 400 for end effector 114 in FIG. 4 that uses applicator 404 to apply liquid 138 onto plurality of surfaces 130 may allow different types of liquid 138 to be used. For example, without limitation, liquids that might have undesired effects to humans when sprayed but no undesired effects when applied without spraying may be used when end effector 114 has applicator 404. Further, by using applicator 404, flammable cleaning liquids may also be used because the flammable vapors produced that are produced are reduced to within selected tolerances or to none.

The illustrations of cleaning environment 100 in FIG. 1 and end effector 114 in FIGS. 2-4 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, first duct 222 and second duct 224 may not be present. Undesired material 142 may move from first opening 228 in first vacuum cover 218 and from second opening 230 in second vacuum cover 220 directly into main vacuum duct 226. In other illustrative examples, other sets of brushes may be included in place of or in addition to first set of brushes 406, second set of brushes 408, and third set of brushes 410.

Figure 5:
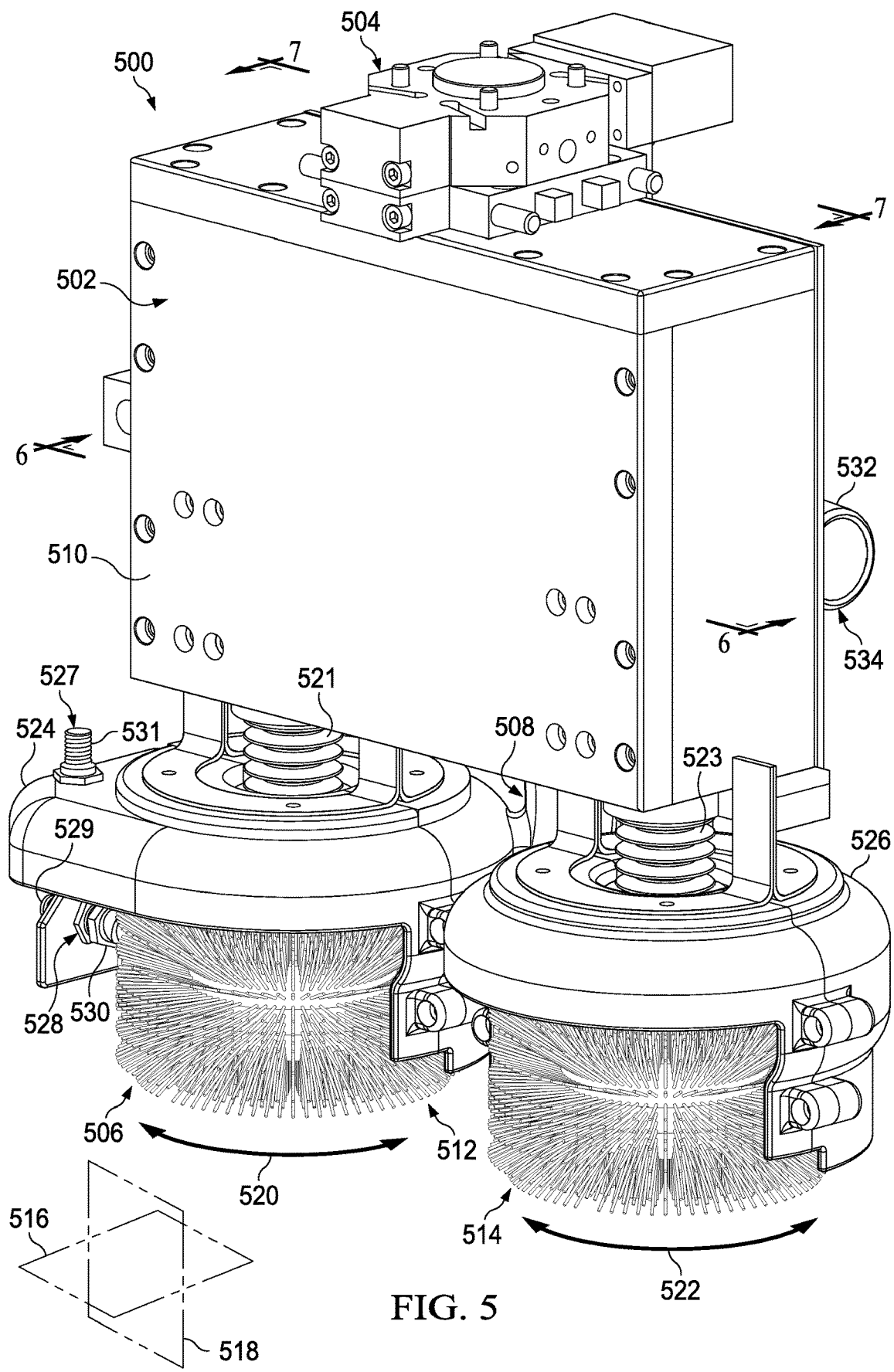
FIG. 5 is an illustration of a front isometric view of a first configuration for an end effector in accordance with an illustrative embodiment.

With reference now to FIGS. 5-9, illustrations of a first configuration for an end effector are depicted in accordance with an illustrative embodiment. In FIG. 5, an illustration of a front isometric view of a first configuration for an end effector is depicted in accordance with an illustrative embodiment. In this illustrative example, end effector 500 may be an example of one implementation for end effector 114 in FIG. 1. End effector 500 may be implemented using first configuration 200 in FIG. 2.

As depicted, end effector 500 may include platform 502, robotic interface 504, plurality of cleaning elements 506, and vacuum system 508. Platform 502, robotic interface 504, plurality of cleaning elements 506, and vacuum system 508 may be examples of implementations for platform 116, robotic interface 118, plurality of cleaning elements 120, and vacuum system 124, respectively, in FIG. 1.

Robotic interface 504, plurality of cleaning elements 506, and vacuum system 508 may be associated with platform 502. Robotic interface 504 may be used to attach platform 502 to a robotic device (not shown), such as robotic device 112 in FIG. 1.

Platform 502 may be configured to house other components (not shown). For example, cover 510 of platform 502 may be removed to provide access to these other components.

Plurality of cleaning elements 506 may include first plurality of bristles 512 and second plurality of bristles 514. First plurality of bristles 512 and second plurality of bristles 514 may be examples of implementations for first plurality of bristles 206 and second plurality of bristles 208, respectively, in FIG. 2.

A first portion of each of first plurality of bristles 512 and second plurality of bristles 514 may be used to contact any surface that is substantially parallel to first plane 516. A second portion of each of first plurality of bristles 512 and second plurality of bristles 514 may be used to contact any surface that is substantially parallel to second plane 518. Second plane 518 may be substantially perpendicular to first plane 516.

In this illustrative example, first plurality of bristles 512 may be configured to rotate in the direction of arrow 520. Second plurality of bristles 514 may be configured to rotate in the direction of arrow 522. End effector 500 may also include vibration damper 521 and vibration damper 523. Vibration damper 521 and vibration damper 523 may be configured to reduce the vibrations caused by the rotation of first plurality of bristles 512 and second plurality of bristles 514, respectively.

Vacuum system 508 may include first vacuum cover 524 and second vacuum cover 526, which may be examples of implementations for first vacuum cover 218 and second vacuum cover 220, respectively, in FIG. 2. First vacuum cover 524 and second vacuum cover 526 may be associated with first plurality of bristles 512 and second plurality of bristles 514, respectively.

As depicted, spraying device 527, spraying device 528, and another spraying device (not shown) may be associated with first vacuum cover 524. These spraying devices may be an example of one implementation for number of spraying devices 204 in FIG. 2.

Spraying device 528 may include fastener device 529 and spray nozzle 530. Fastener device 529 may be used to attach spray nozzle 530 to the inside of first vacuum cover 524. Spraying device 527 may include a spray nozzle (not shown) and fastener device 531 for attaching this spray nozzle to the inside of first vacuum cover 524. Further, the other spraying device (not shown) may also include a spray nozzle (not shown) and a fastener device (not shown) for attaching the spray nozzle to the inside of first vacuum cover 524.

Spraying device 527, spraying device 528, and the other spraying device (not shown) may be used to spray a liquid (not shown) towards first plurality of bristles 512. First plurality of bristles 512 may be used to apply the liquid onto a surface (not shown) and clean this surface using the liquid.

During the cleaning performed by first plurality of bristles 512, excess liquid and other types of undesired material may be removed using vacuum system 508. In particular, the undesired material may be moved into main vacuum duct 532, which may be an example of one implementation for main vacuum duct 226 in FIG. 2. End 534 of main vacuum duct 532 may be configured for attachment to a receptacle (not shown), such as receptacle 234 in FIG. 2.

Second plurality of bristles 514 may be rotated to dry the surface after the surface has been cleaned by first plurality of bristles 512. Any remaining liquid and other types of undesired material may be removed using vacuum system 508 during the drying performed by second plurality of bristles 514.

Figure 6:
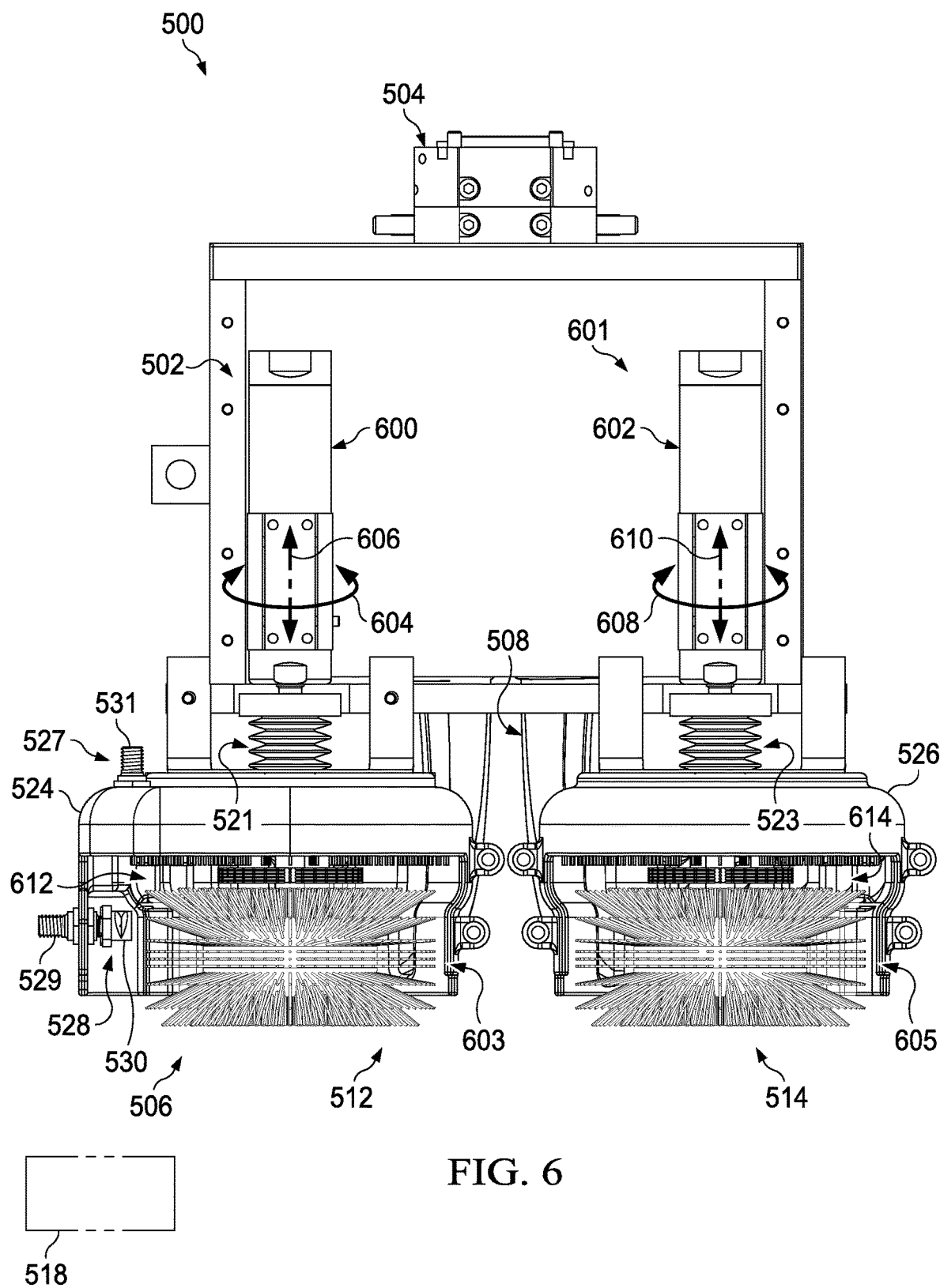
FIG. 6 is an illustration of a side view of an end effector with a cover of a platform removed in accordance with an illustrative embodiment.

Turning now to FIG. 6, an illustration of a side view of end effector 500 from FIG. 5 with cover 510 of platform 502 removed is depicted in accordance with an illustrative embodiment. In this illustrative example, a side view of end effector 500 is depicted with respect to lines 6-6 in FIG. 5. Cover 510 has been removed such that the contents housed within platform 502 may be seen more clearly.

As depicted, platform 502 may house motor system 601. Motor system 601 may be an example of one implementation for motor system 122 in FIG. 1. Motor system 601 may include first pneumatic motor 600 and second pneumatic motor 602, which may be examples of implementations for first pneumatic motor 210 and second pneumatic motor 212 in FIG. 2.

First pneumatic motor 600 may be associated with first base 603 located below first vacuum cover 524. First plurality of bristles 512 extend from first base 603. Second pneumatic motor 602 may be associated with second base 605 located below second vacuum cover 526. Second plurality of bristles 514 may extend from second base 605.

First pneumatic motor 600 may be operated to rotate first base 603, and thereby first plurality of bristles 512, in the direction of arrow 604 about first axis 606. First axis 606 may be an example of one implementation for first axis 214 in FIG. 2.

Second pneumatic motor 602 may be operated to rotate second base 605, and thereby second plurality of bristles 514, in the direction of arrow 608 about second axis 610. Second axis 610 may be an example of one implementation for second axis 216 in FIG. 2.

As depicted, first members 612 may be associated with first vacuum cover 524 and second members 614 may be associated with second vacuum cover 526. First members 612 and second members 614 may be configured to clean first plurality of bristles 512 and second plurality of bristles 514, respectively, such that undesired material removed from a surface by these bristles may be then sent into main vacuum duct 532 in FIG. 5.

Figure 7:
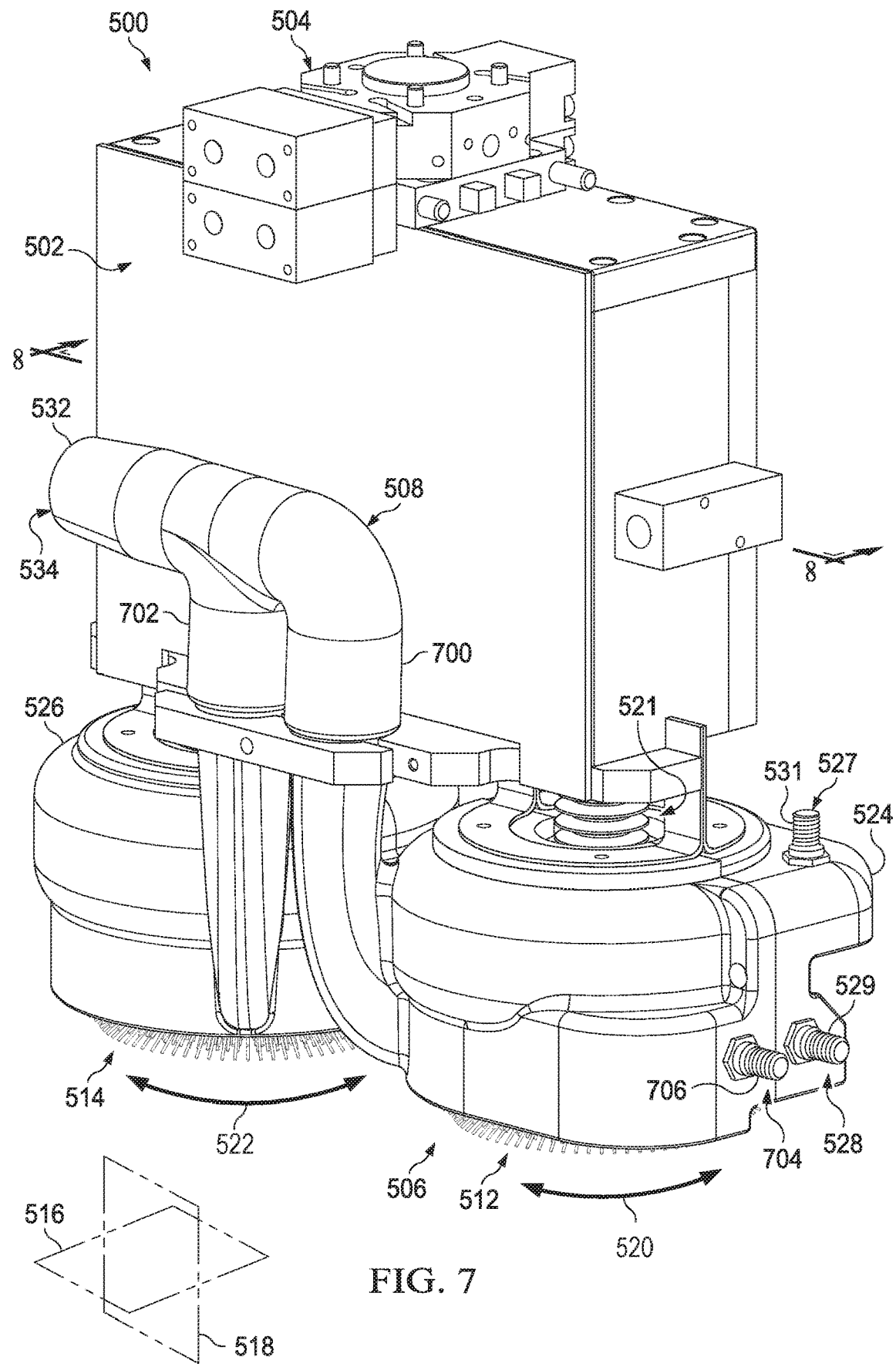
FIG. 7 an illustration of a back isometric view of an end effector in accordance with an illustrative embodiment.

With reference now to FIG. 7, an illustration of a back isometric view of end effector 500 from FIG. 5 is depicted in accordance with an illustrative embodiment. In this illustrative example, a back isometric view of end effector 500 is depicted with respect to lines 7-7 in FIG. 5.

First duct 700 and second duct 702 of vacuum system 508 may be seen. First duct 700 and second duct 702 may be examples of implementation for first duct 222 and second duct 224, respectively, in FIG. 2.

Spraying device 704 may also be seen in this example. Spraying device 704 may be an example of one implementation for a spraying device in number of spraying devices 204 in FIG. 2. Only fastener device 706 of spraying device 704 is seen in this illustrative example.

Figure 8:
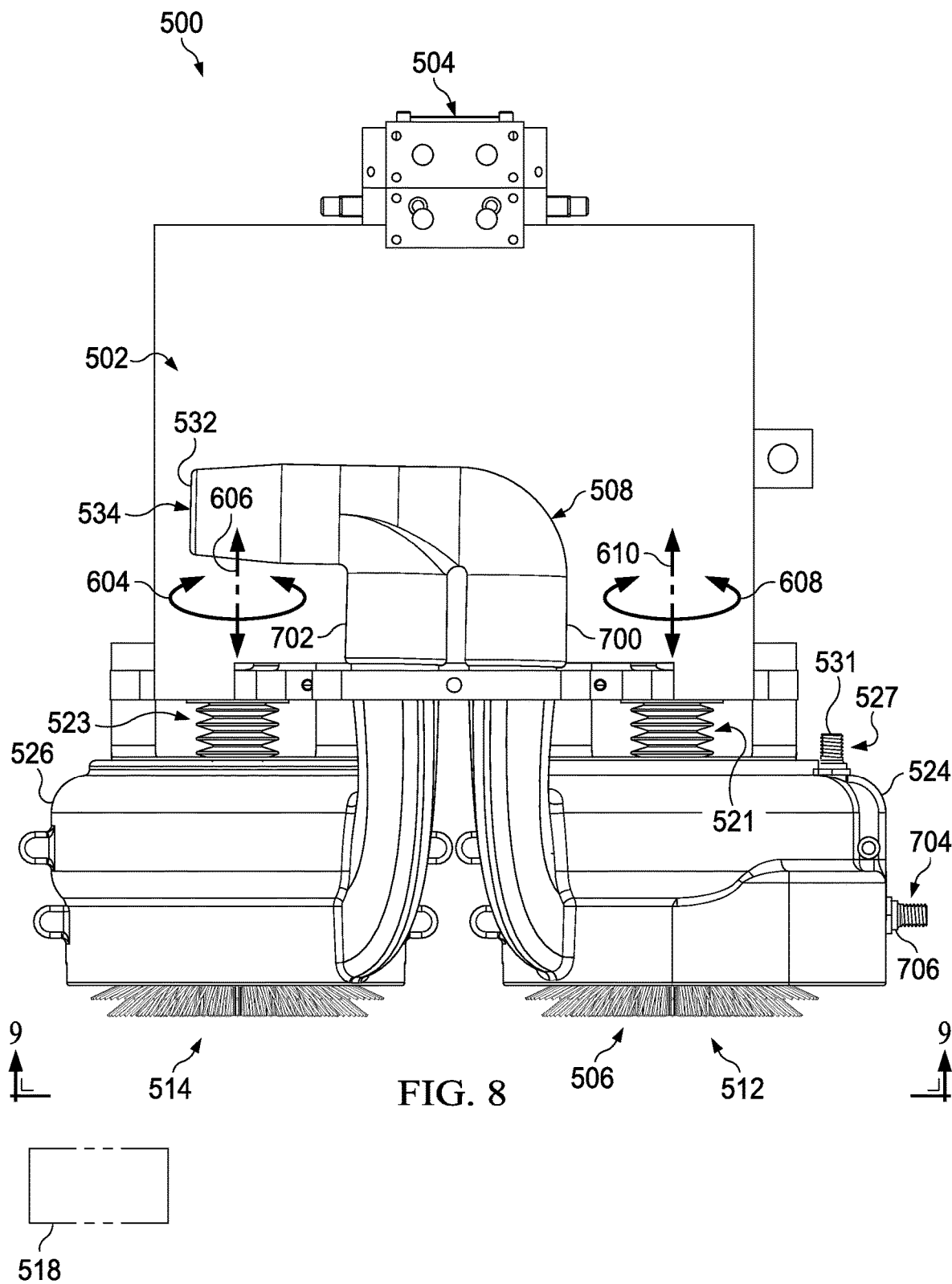
FIG. 8 is an illustration of a side view of an end effector in accordance with an illustrative embodiment.

Turning now to FIG. 8, an illustration of a side view of end effector 500 from FIG. 7 is depicted in accordance with an illustrative embodiment. In this illustrative example, a side view of end effector 500 is depicted with respect to lines 8-8 in FIG. 7.

Figure 9:
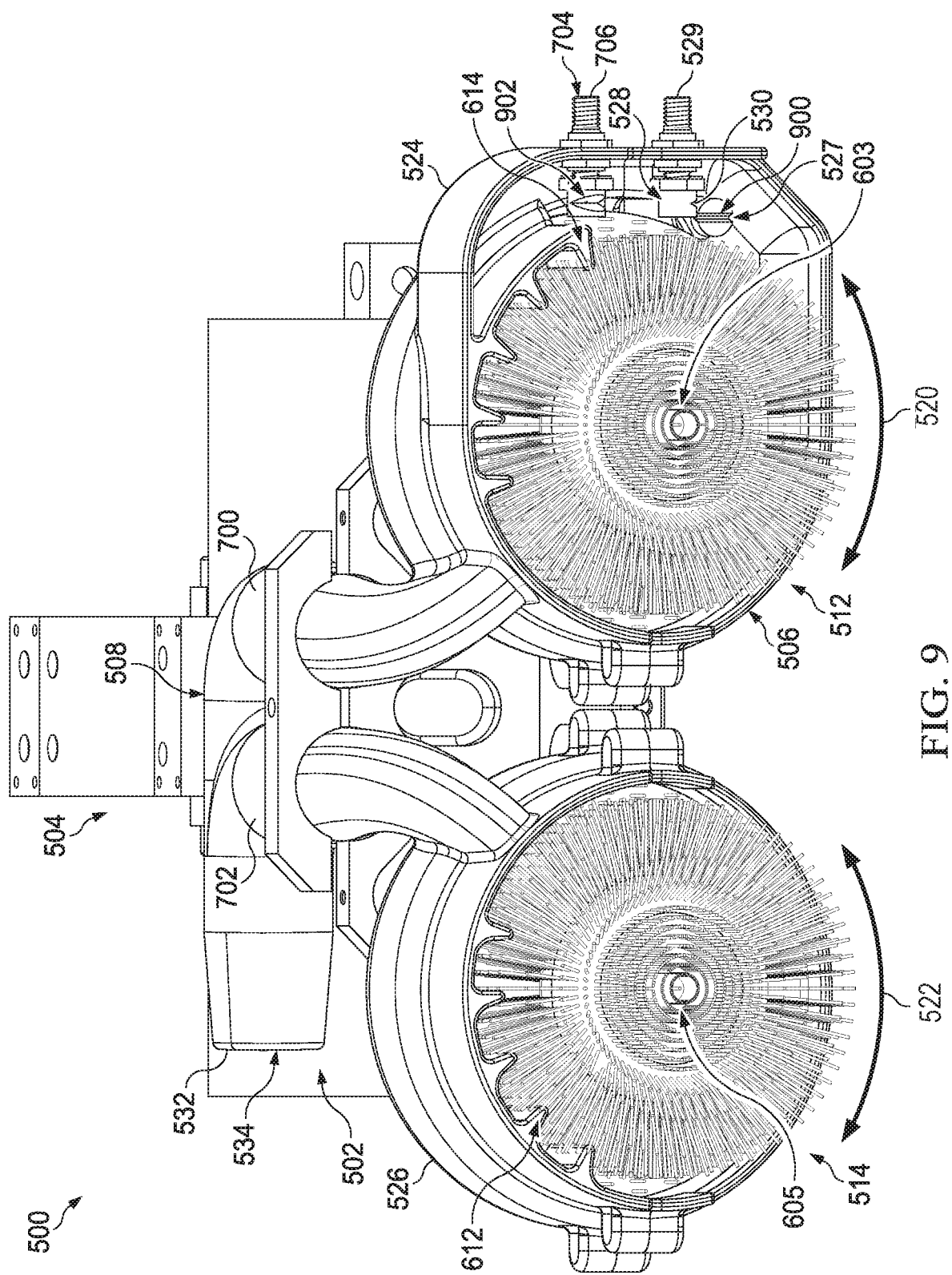
FIG. 9 is an illustration of a bottom perspective view of an end effector in accordance with an illustrative embodiment.

With reference now to FIG. 9, an illustration of a bottom perspective view of end effector 500 from FIG. 8 is depicted in accordance with an illustrative embodiment. In this illustrative example, a bottom perspective view of end effector 500 is depicted with respect to lines 9-9 in FIG. 8.

Spray nozzle 900 of spraying device 527 may be seen. Further, spray nozzle 902 of spraying device 704 may be seen. As depicted, no spraying devices are associated with second vacuum cover 526. Second plurality of bristles 514 may be used for drying.

Figure 10:
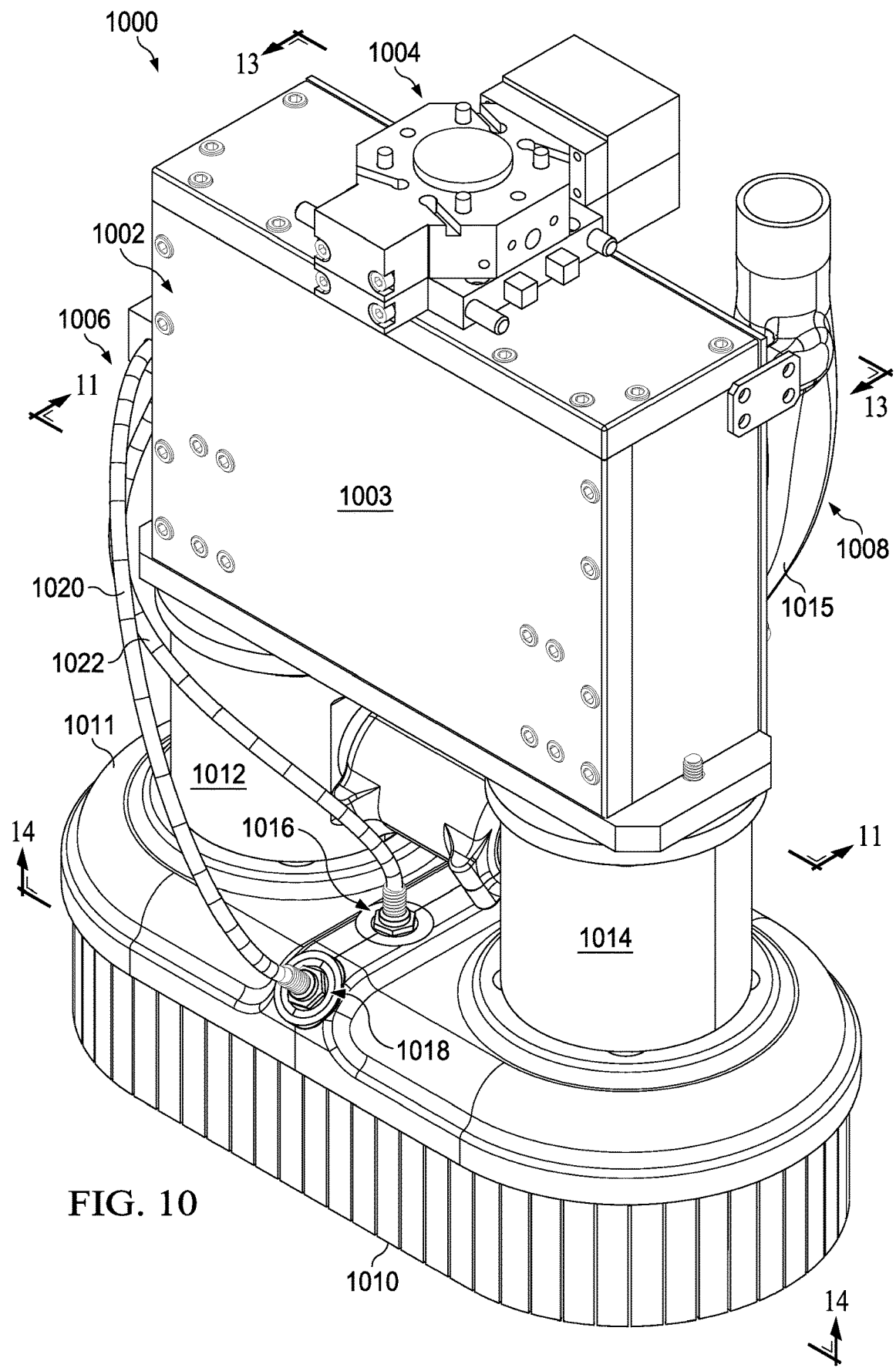
FIG. 10 is an illustration of a front isometric view of a second configuration for an end effector in accordance with an illustrative embodiment.

With reference now to FIGS. 10-14, illustrations of a second configuration for an end effector are depicted in accordance with an illustrative embodiment. In FIG. 10, an illustration of a front isometric view of a second configuration for an end effector is depicted in accordance with an illustrative embodiment. In this illustrative example, end effector 1000 may be an example of one implementation for end effector 114 in FIG. 1. End effector 1000 may be implemented using second configuration 300 in FIG. 3.

As depicted, end effector 1000 includes platform 1002, robotic interface 1004, liquid application system 1006, and vacuum system 1008. Platform 1002, robotic interface 1004, liquid application system 1006, and vacuum system 1008 may be examples of implementations for platform 116, robotic interface 118, liquid application system 121, and vacuum system 124, respectively, in FIG. 1.

Robotic interface 1004, liquid application system 1006, and vacuum system 1008 may be associated with platform 1002. Platform 1002 may be configured to house other components (not shown) of end effector 1000. Cover 1003 of platform 1002 may be removed to provide access to these other components.

End effector 1000 may also include protective shield 1010. Protective shield 1010 may be an example of one implementation for protective shield 318 in FIG. 3.

Protective shield 1010 may be associated with vacuum cover 1011. Vacuum cover 1011 may be an example of one implementation for vacuum cover 320 in FIG. 3. First vacuum chamber 1012 and second vacuum chamber 1014 may be associated with vacuum cover 1011. First vacuum chamber 1012 and second vacuum chamber 1014 may be examples of implementations for first vacuum chamber 322 and second vacuum chamber 324, respectively, in FIG. 3. Vacuum cover 1011, first vacuum chamber 1012, second vacuum chamber 1014, and main vacuum duct 1015 may be part of vacuum system 1008.

Liquid application system 1006 may include spraying device 1016 and spraying device 1018, which are both associated with vacuum cover 1011. Spraying device 1016 and spraying device 1018 may be examples of implementations for spraying devices in number of spraying devices 304 in FIG. 3. Spraying device 1016 may be configured to receive a liquid (not shown) through hose 1020 and spray this liquid under vacuum cover 1011. Spraying device 1018 may be configured to receive the liquid (not shown) through hose 1022 and spray this liquid into the area below vacuum cover 1011.

Figure 11:
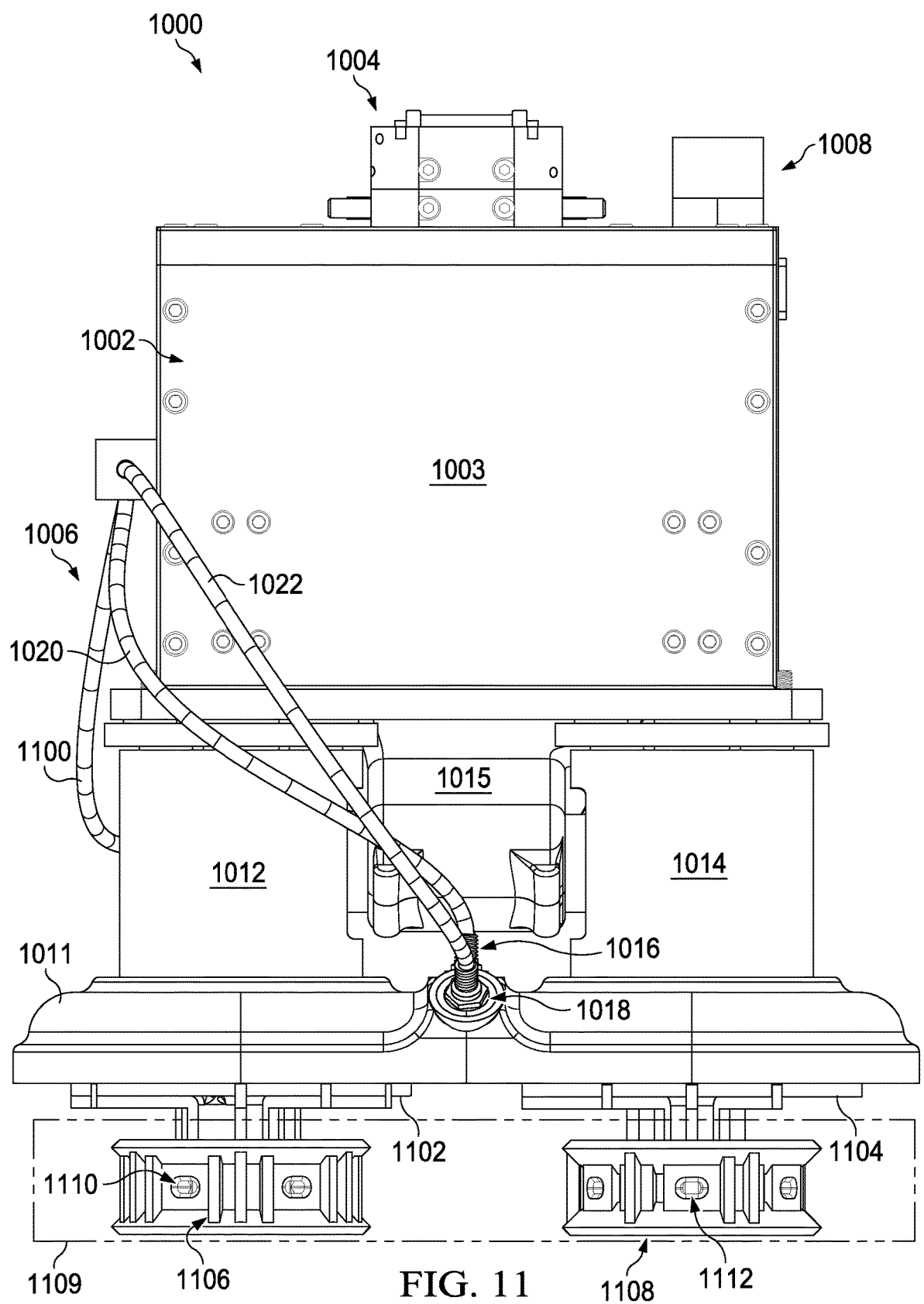
FIG. 11 is an illustration of a side view of an end effector in accordance with an illustrative embodiment.

Turning now to FIG. 11, an illustration of a side view of end effector 1000 from FIG. 10 is depicted in accordance with an illustrative embodiment. In this illustrative example, a side view of end effector 1000 is depicted with respect to lines 11-11 in FIG. 10.

Hose 1100 may be seen. Hose 1100 may deliver the liquid (not shown) to another spraying device (not shown) associated with vacuum cover 1011.

Protective shield 1010 has been removed such that first base 1102 and second base 1104 may be more clearly seen. First base 1102 and second base 1104 may be associated with vacuum cover 1011. First plurality of bristles 1106 may extend from first base 1102, and second plurality of bristles 1108 may extend from second base 1104. First plurality of bristles 1106 and second plurality of bristles 1108 may be examples of implementations for first plurality of bristles 306 and second plurality of bristles 308, respectively, in FIG. 3.

A portion of each of first plurality of bristles 1106 and second plurality of bristles 1108 may be configured to contact a surface (not shown) that lies along first plane 1109. Another portion of each of first plurality of bristles 1106 and second plurality of bristles 1108 may be configured to contact another surface (not shown) that lies along a second plane (not shown) that is substantially perpendicular to first plane 1109.

As depicted, first base 1102 may have first plurality of channels 1110. Second base 1104 may have second plurality of channels 1112. Vacuum system 1008 may be configured to generate an airflow that allows air to move from first plurality of channels 1110 and second plurality of channels 1112 through first vacuum chamber 1012 and second vacuum chamber 1014, respectively, into main vacuum duct 1015.

Figure 12:
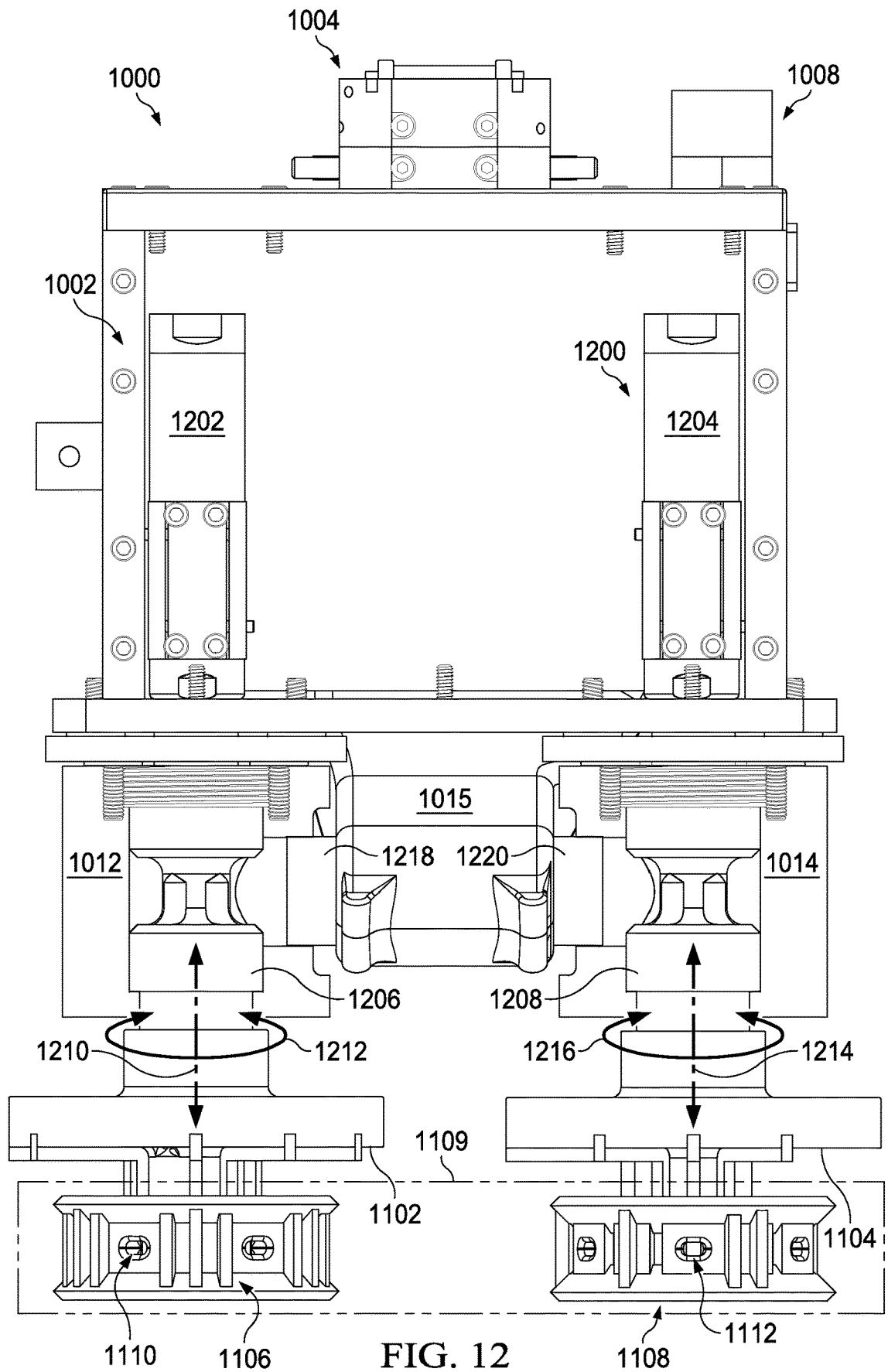
FIG. 12 is an illustration of a partially cutaway side view of an end effector in accordance with an illustrative embodiment.

Turning now to FIG. 12, an illustration of a partially cutaway side view of end effector 1000 from FIG. 11 is depicted in accordance with an illustrative embodiment. In this illustrative example, cover 1003 has been removed such that the components housed by platform 1002 may be more clearly seen.

Further, portions of first vacuum chamber 1012 and second vacuum chamber 1014 have been cutaway such that the components within these vacuum chambers may be more clearly seen. Still further, vacuum cover 1011 has been removed such that first base 1102 and second base 1104 may be more clearly seen.

As depicted, platform 1002 may house motor system 1200. Motor system 1200 may be an example of one implementation for motor system 122 in FIG. 1. Motor system 1200 may include first pneumatic motor 1202 and second pneumatic motor 1204, which may be examples of implementations for first pneumatic motor 310 and second pneumatic motor 312, respectively, in FIG. 3.

First rotary member 1206 may be present within first vacuum chamber 1012. First rotary member 1206 may be associated with both first pneumatic motor 1202 and first base 1102. Second rotary member 1208 may be present within second vacuum chamber 1014. Second rotary member 1208 may be associated with both second pneumatic motor 1204 and second base 1104.

First pneumatic motor 1202 may be operated to rotate first rotary member 1206, and thereby first base 1102 and first plurality of bristles 1106 about first axis 1210 in the direction of arrow 1212. Second pneumatic motor 1204 may be operated to rotate second rotary member 1208, and thereby second base 1104 and second plurality of bristles 1108 about second axis 1214 in the direction of arrow 1216. First axis 1210 and second axis 1214 may be examples of implementations for first axis 314 and second axis 316, respectively, in FIG. 3.

In this illustrative example, vacuum system 1008 may also include first duct 1218 and second duct 1220. First duct 1218 and second duct 1220 may be examples of implementations for first duct 330 and second duct 332, respectively, in FIG. 3. Vacuum system 1008 may generate an airflow that allows undesired material to be moved through first plurality of channels 1110 into first rotary member 1206, into first duct 1218, and into main vacuum duct 1015. Further, this airflow may allow undesired material to be moved through second plurality of channels 1112 into second rotary member 1208, into second duct 1220, and into main vacuum duct 1015.

Figure 13:
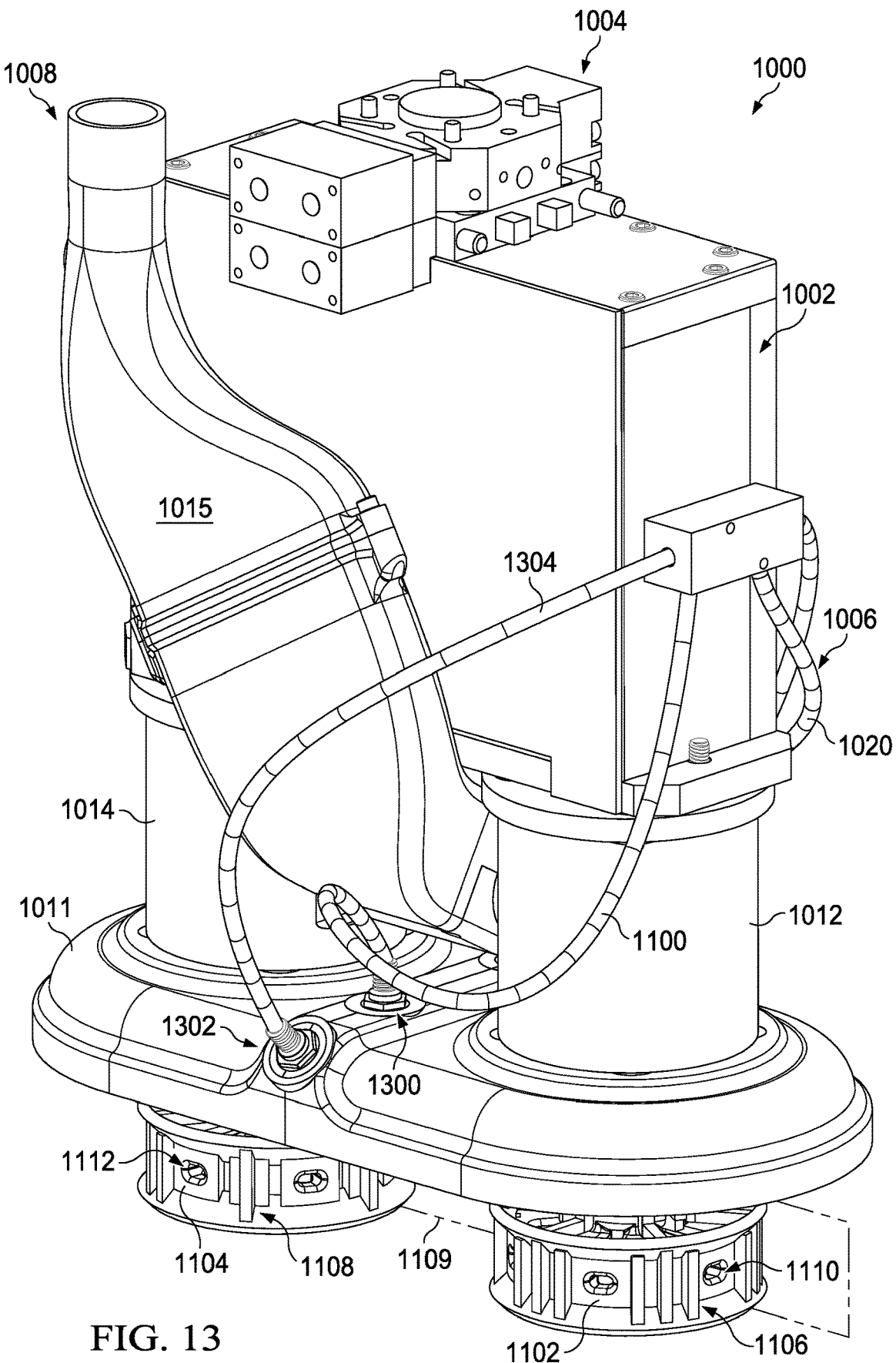
FIG. 13 is an illustration of a back isometric view of an end effector in accordance with an illustrative embodiment.

With reference now to FIG. 13, an illustration of a back isometric view of end effector 1000 from FIG. 10 is depicted in accordance with an illustrative embodiment. In this illustrative example, a back isometric view of end effector 1000 from FIG. 10 is depicted with respect to lines 13-13 in FIG. 10.

In this illustrative example, spraying device 1300 and spraying device 1302 may be seen. Spraying device 1300 and spraying device 1302 may be examples of implementations for spraying devices in number of spraying devices 304 in FIG. 3. Hose 1100 may deliver liquid to spraying device 1300. Hose 1304 may deliver liquid to spraying device 1302.

Figure 14:
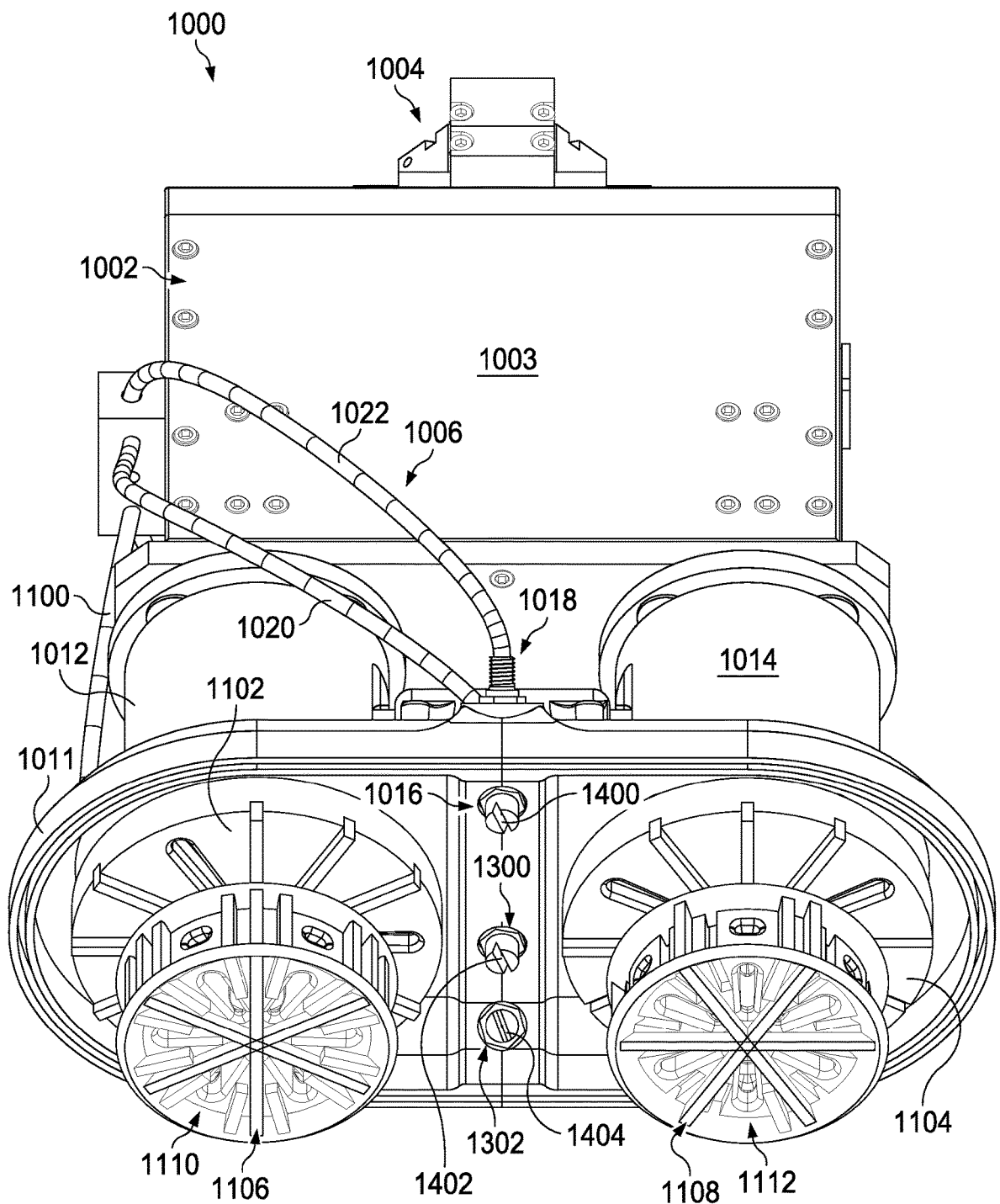
FIG. 14 is an illustration of a bottom perspective view of an end effector in accordance with an illustrative embodiment.

With reference now to FIG. 14, an illustration of a bottom perspective view of end effector 1000 from FIG. 10 is depicted in accordance with an illustrative embodiment. In this illustrative example, a bottom perspective view of end effector 1000 from FIG. 10 is depicted with respect to lines 14-14 in FIG. 10.

In this illustrative example, spray nozzle 1400 of spraying device 1016 may be seen. Spray nozzle 1402 of spraying device 1300 may be seen. Further, spray nozzle 1404 of spraying device 1302 may be seen. Spraying nozzle of spraying device 1018 from FIG. 10 is not seen in this illustrative example.

Figure 15:
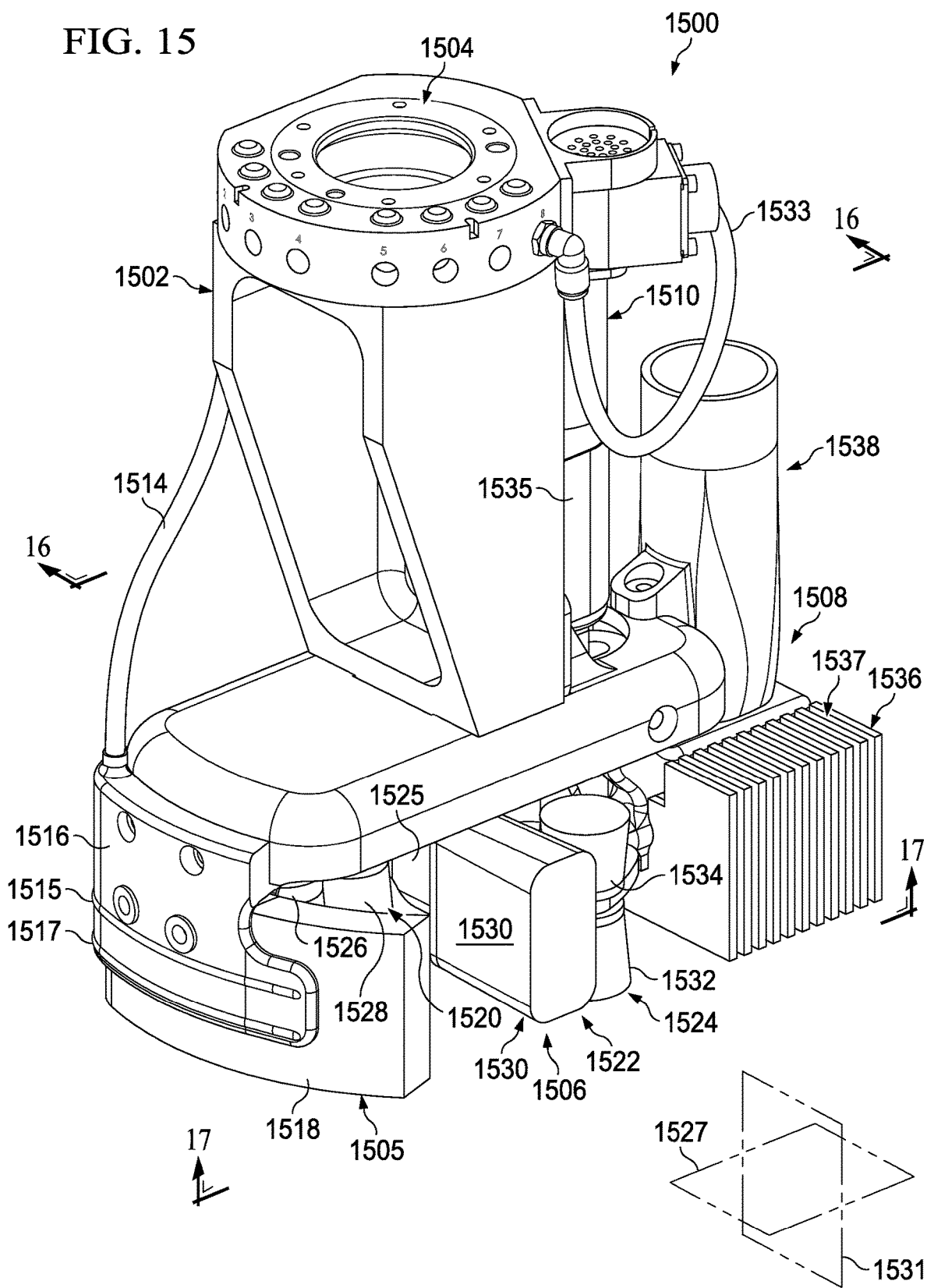
FIG. 15 is an illustration of a front isometric view of a third configuration for an end effector in accordance with an illustrative embodiment.

With reference now to FIGS. 15-21, illustrations of a third configuration for an end effector are depicted in accordance with an illustrative embodiment. In FIG. 15, an illustration of a front isometric view of a third configuration for an end effector is depicted in accordance with an illustrative embodiment.

In this illustrative example, end effector 1500 may be an example of one implementation for end effector 114 in FIG. 1. End effector 1500 may be implemented based on third configuration 400 in FIG. 4.

As depicted, end effector 1500 may include platform 1502, robotic interface 1504, liquid application system 1505, plurality of cleaning elements 1506, vacuum system 1508, and motor system 1510. Platform 1502, robotic interface 1504, liquid application system 1505, plurality of cleaning elements 1506, vacuum system 1508, and motor system 1510 may be examples of implementations for platform 116, robotic interface 118, liquid application system 121, plurality of cleaning elements 120, vacuum system 124, and motor system 122, respectively, in FIG. 1.

Liquid application system 1505 may include hose 1514, channeled structure 1516, and applicator 1518. Hose 1514, channeled structure 1516, and applicator 1518 may be examples of implementations for hose 418, channeled structure 414, and applicator 404, respectively, in FIG. 4. Hose 1514 may deliver a liquid (not shown) to channel 1515 and channel 1517 in channeled structure 1516. Channel 1515 and channel 1517 may be an example of one implementation for number of channels 416 in FIG. 4.

The liquid in channel 1515 and channel 1517 may move towards applicator 1518 by capillary action. In this illustrative example, applicator 1518 may take the form of a sponge. Applicator 1518 may absorb the liquid from channel 1515 and channel 1517. Platform 1502 may be moved such that applicator 1518 applies at least a portion of the absorbed liquid onto a plurality of surfaces.

In this illustrative example, plurality of cleaning elements 1506 may include first set of brushes 1520, second set of brushes 1522, and third set of brushes 1524. First set of brushes 1520, second set of brushes 1522, and third set of brushes 1524 may be examples of implementations for first set of brushes 406, second set of brushes 408, and third set of brushes 410, respectively, in FIG. 4.

First set of brushes 1520, second set of brushes 1522, and third set of brushes 1524 may be attached to structure 1525. Structure 1525 may be an example of one implementation for structure 428 in FIG. 4.

First set of brushes 1520 may include brush 1526 and brush 1528. Brush 1526 and brush 1528 may be used to clean a surface (not shown) that is substantially parallel to first plane 1527. Second set of brushes 1522 may include brush 1530. Brush 1530 may be used to clean a surface (not shown) that is substantially parallel to second plane 1531. Second plane 1531 may be substantially perpendicular to first plane 1527.

Further, third set of brushes 1524 may include brush 1532 and brush 1534. Brush 1532 and brush 1534 may be used to clean surfaces (not shown) that are substantially parallel to first plane 1527.

Motor system 1510 may include pneumatic motor 1535. Pneumatic motor 1535 may be an example of one implementation for pneumatic motor 422 in FIG. 4. Air hose 1533 may be configured to supply air to pneumatic motor 1535 to operate pneumatic motor 1535.

Pneumatic motor 1535 may be operated to move plurality of cleaning elements 1506 in a manner that effectively cleans surfaces. First set of brushes 1520, second set of brushes 1522, and third set of brushes 1524 may be moved in a reciprocating manner. In other words, these brushes may be moved back and forth over surfaces multiple times.

As depicted, vacuum system 1508 may include plurality of flexible members 1536 and vacuum duct 1538. Plurality of flexible members 1536 and vacuum duct 1538 may be examples of implementations for plurality of flexible members 432 and vacuum duct 431, respectively, in FIG. 1.

In this illustrative example, each of plurality of flexible members 1536 may be a squeegee member. As depicted, plurality of gaps 1537 may be present between plurality of flexible members 1536. Plurality of flexible members 1536 may be configured to wipe and dry the surfaces cleaned by plurality of cleaning elements 1506 and remove any undesired material from these surfaces.

Figure 16:
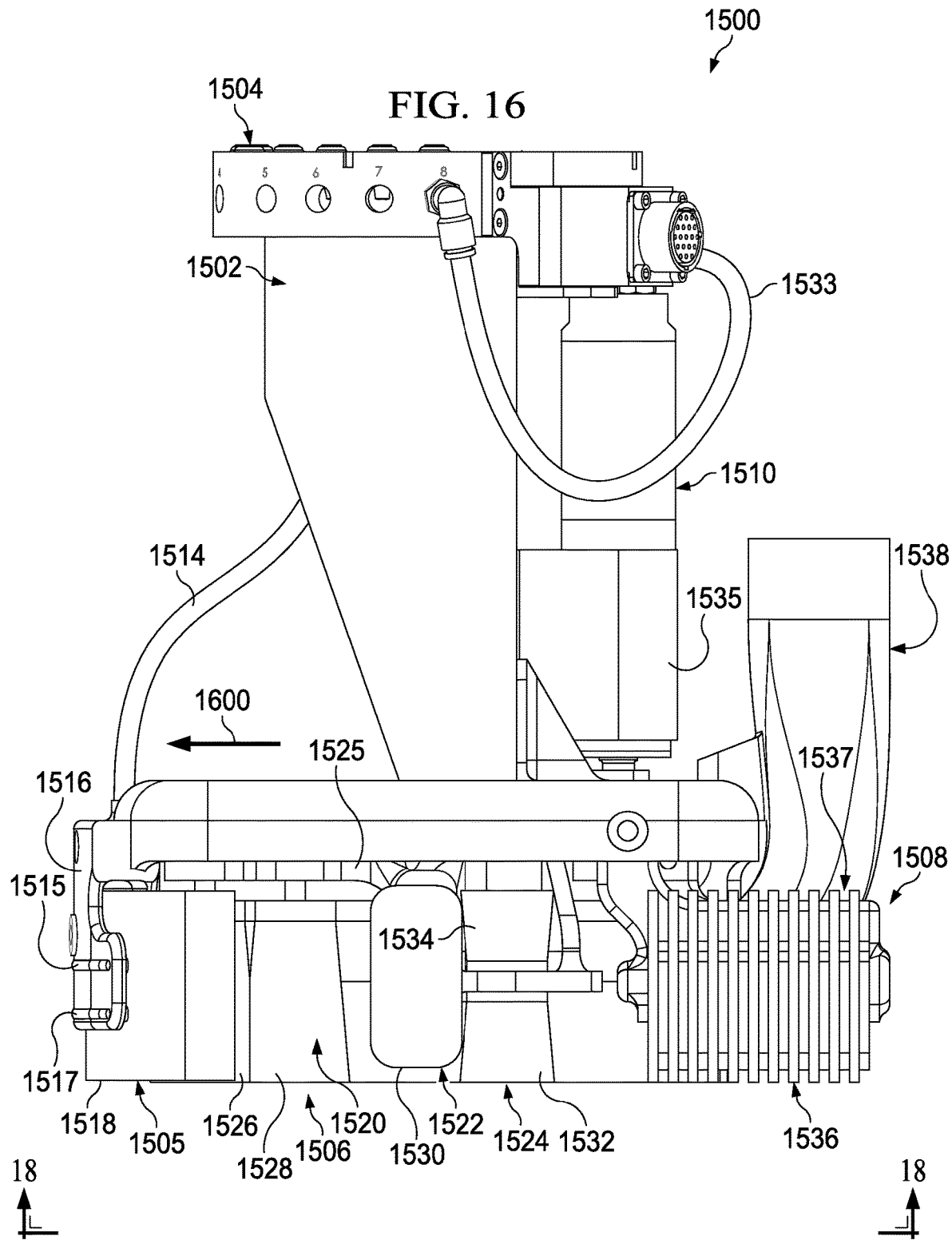
FIG. 16 is an illustration of a side view of an end effector in accordance with an illustrative embodiment.

With reference now to FIG. 16, an illustration of a side view of end effector 1500 from FIG. 15 is depicted in accordance with an illustrative embodiment. A side view of end effector 1500 is depicted with respect to lines 16-16 in FIG. 15. In this illustrative example, end effector 1500 may be moved in the direction of arrow 1600 along some predefined path relative to an object (not shown).

As end effector 1500 is moved in the direction of arrow 1600, applicator 1518 may be used to apply a liquid onto a plurality of surfaces of the object (not shown). Plurality of cleaning elements 1506 may follow applicator 1518 and then clean these surfaces. Plurality of flexible members 1536 may then follow plurality of cleaning elements 1506 to dry the surfaces and ensure that all undesired material is removed from the surfaces within selected tolerances.

Figure 17:
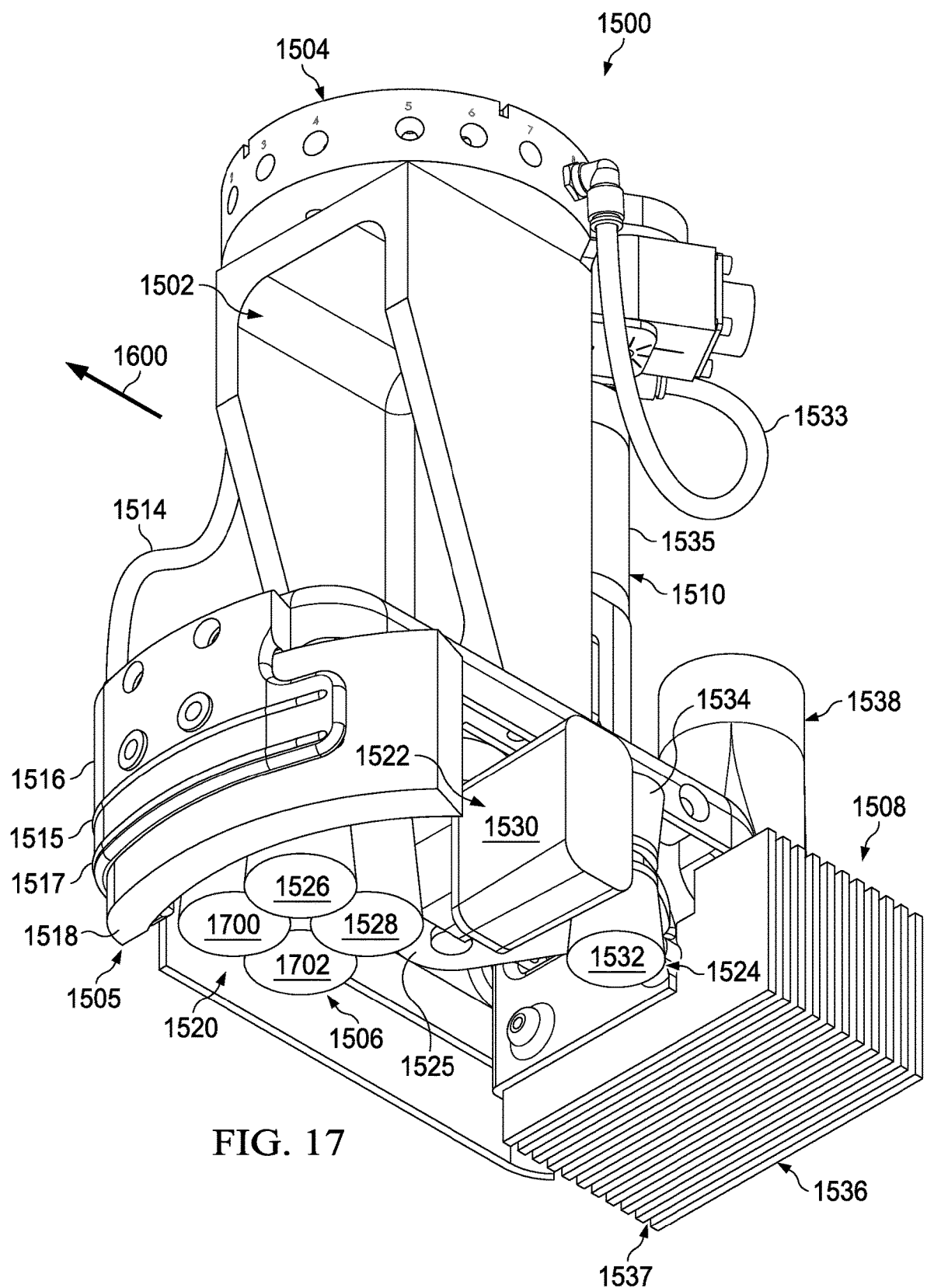
FIG. 17 is an illustration of a bottom isometric view of an end effector in accordance with an illustrative embodiment.

With reference now to FIG. 17, an illustration of a bottom isometric view of end effector 1500 from FIGS. 15-16 is depicted in accordance with an illustrative embodiment. In this illustrative example, a bottom isometric view of end effector 1500 from FIGS. 15-16 is depicted with respect to lines 17-17 in FIG. 15. Brush 1700 and brush 1702 of first set of brushes 1520 may be seen.

Figure 18:
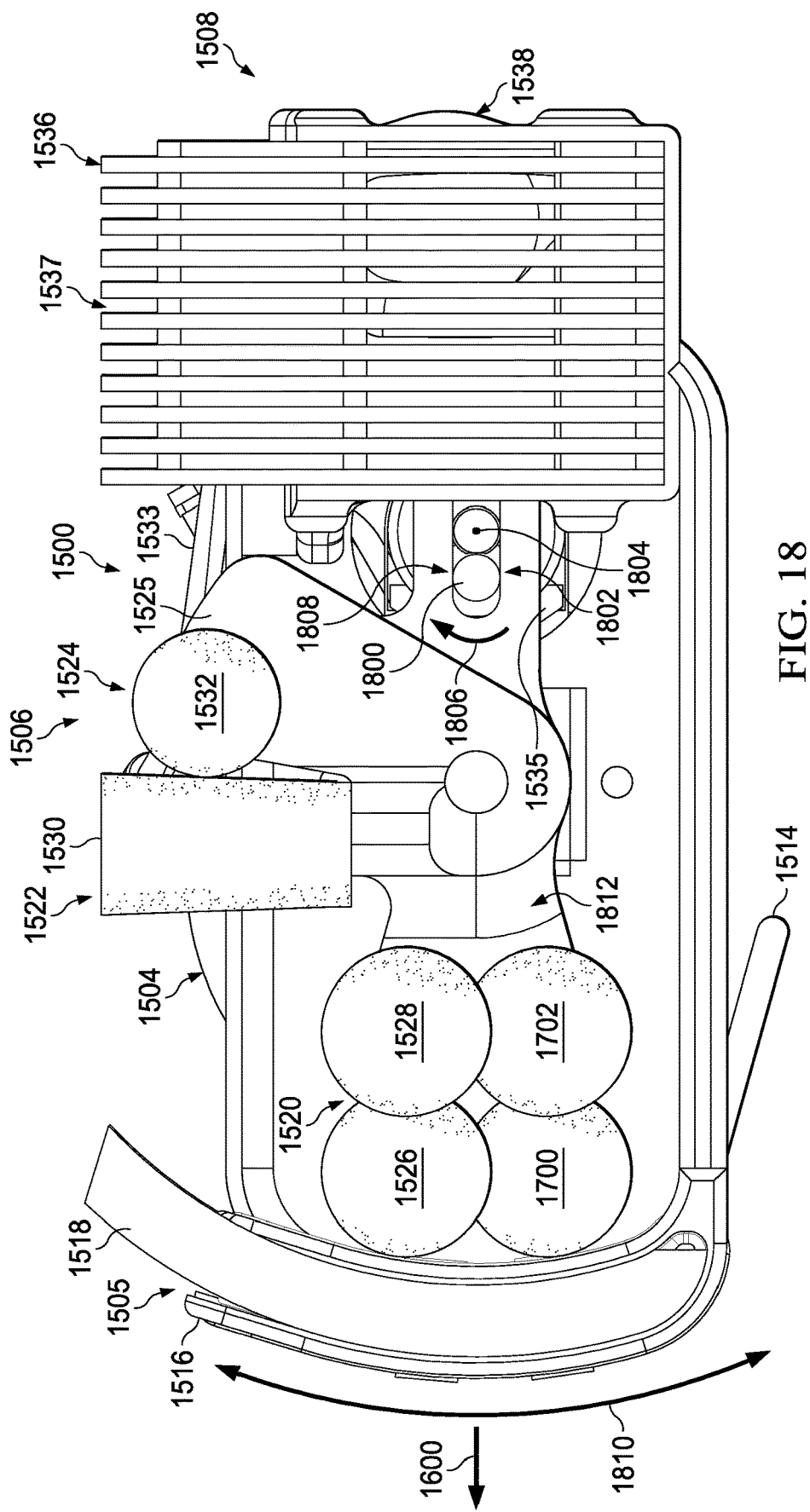
FIG. 18 is an illustration of a bottom isometric view of an end effector in accordance with an illustrative embodiment.

Turning now to FIG. 18, an illustration of a bottom isometric view of end effector 1500 from FIGS. 15-17 is depicted in accordance with an illustrative embodiment. In this illustrative example, a bottom isometric view of end effector 1500 from FIGS. 15-17 is depicted with respect to lines 18-18 in FIG. 16.

As depicted, structure 1525 may be associated with pivoting feature 1800, which may also be associated with pneumatic motor 1535. Pivoting feature 1800 may be located within slot 1802 of structure 1525. Pivoting feature 1800 may be configured to rotate about pivot axis 1804 in the direction of arrow 1806. In this illustrative example, pivoting feature 1800 may be in initial position 1808.

As pivoting feature 1800 rotates about pivot axis 1804, structure 1525 and all of the brushes attached to structure 1525 may be configured to move back and forth in the direction of arrow 1810. In particular, the brushes may be moved in a reciprocating manner. In this illustrative example, structure 1525 may be in initial position 1812.

Figure 19:
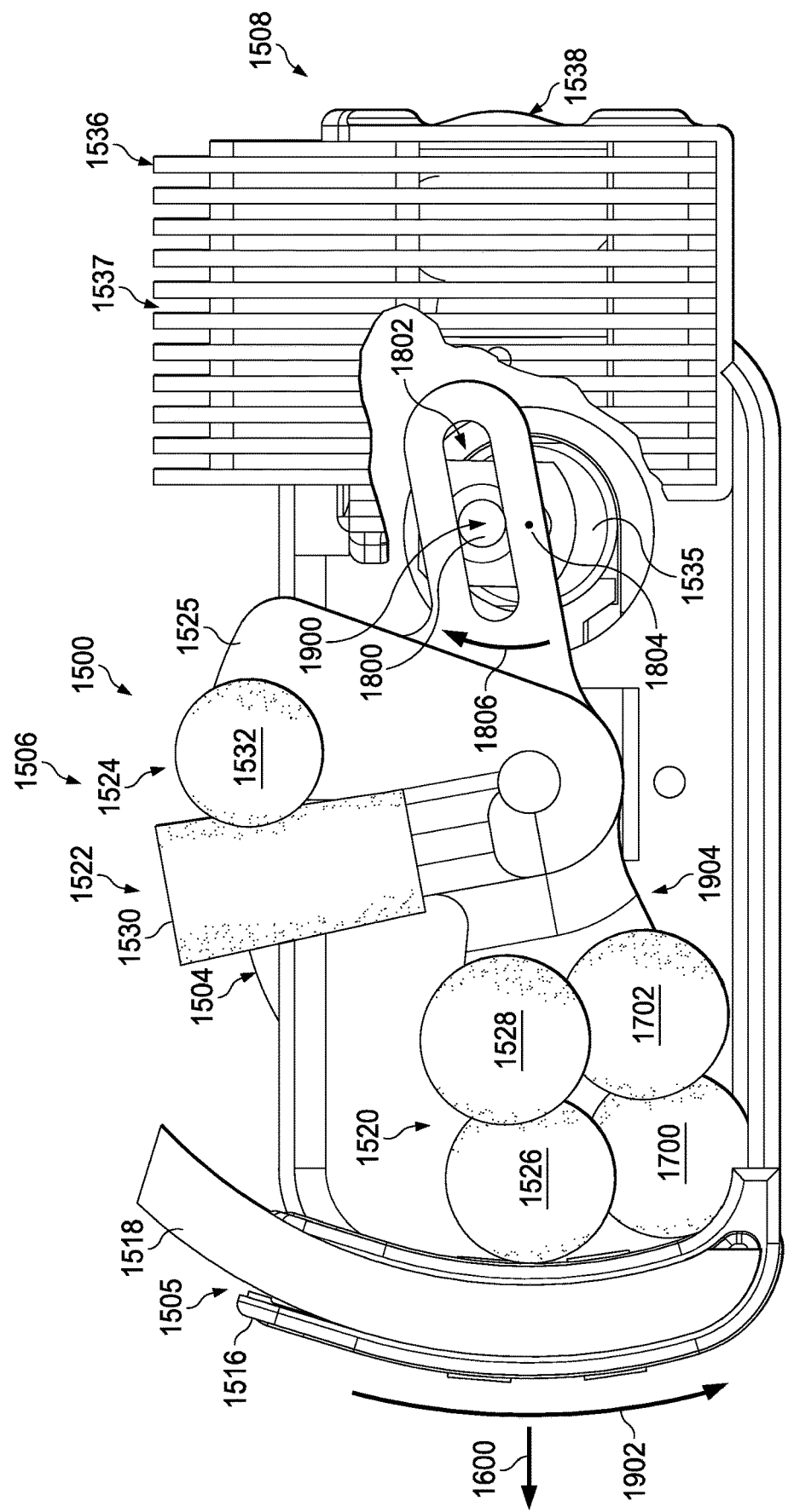
FIG. 19 is an illustration of a pivoting feature in a different position in accordance with an illustrative embodiment.

With reference now to FIG. 19, an illustration of pivoting feature 1800 from FIG. 18 in a different position is depicted in accordance with an illustrative embodiment. In this illustrative example, pivoting feature 1800 has been rotated in the direction of arrow 1806 from initial position 1808 in FIG. 18 to next position 1900. Rotation of pivoting feature 1800 to next position 1900 causes structure 1525 to move in the direction of arrow 1902 from initial position 1812 in FIG. 18 to next position 1904.

Figure 20:
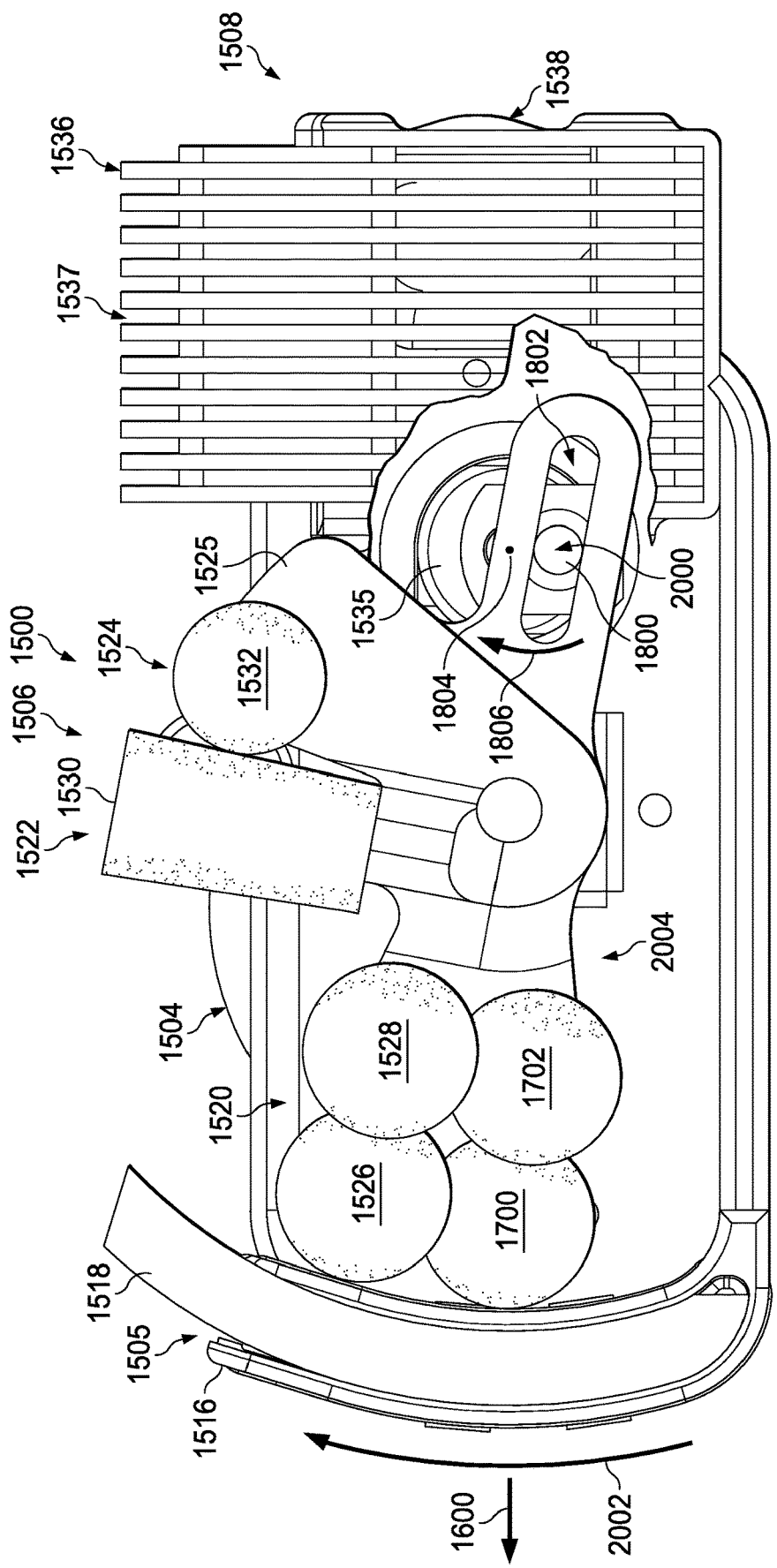
FIG. 20 is another illustration of a pivoting feature in a different position in accordance with an illustrative embodiment.

With reference now to FIG. 20, an illustration of pivoting feature 1800 from FIG. 19 in a different position is depicted in accordance with an illustrative embodiment. In this illustrative example, pivoting feature 1800 has been rotated in the direction of arrow 1806 from next position 1900 in FIG. 19 to next position 2000. Rotation of pivoting feature 1800 to next position 2000 causes structure 1525 to move back in the direction of arrow 2002 from next position 1904 in FIG. 19 to next position 2004.

In this manner, operation of pneumatic motor 1535 causes structure 1525 to move in a reciprocating manner such that the different brushes attached to structure 1525 may be moved back and forth along surfaces. The speed with which pivoting feature 1800 rotates about pivot axis 1804 may determine the speed with which structure 1525 and plurality of cleaning elements 1506 move back and forth.

Figure 21:
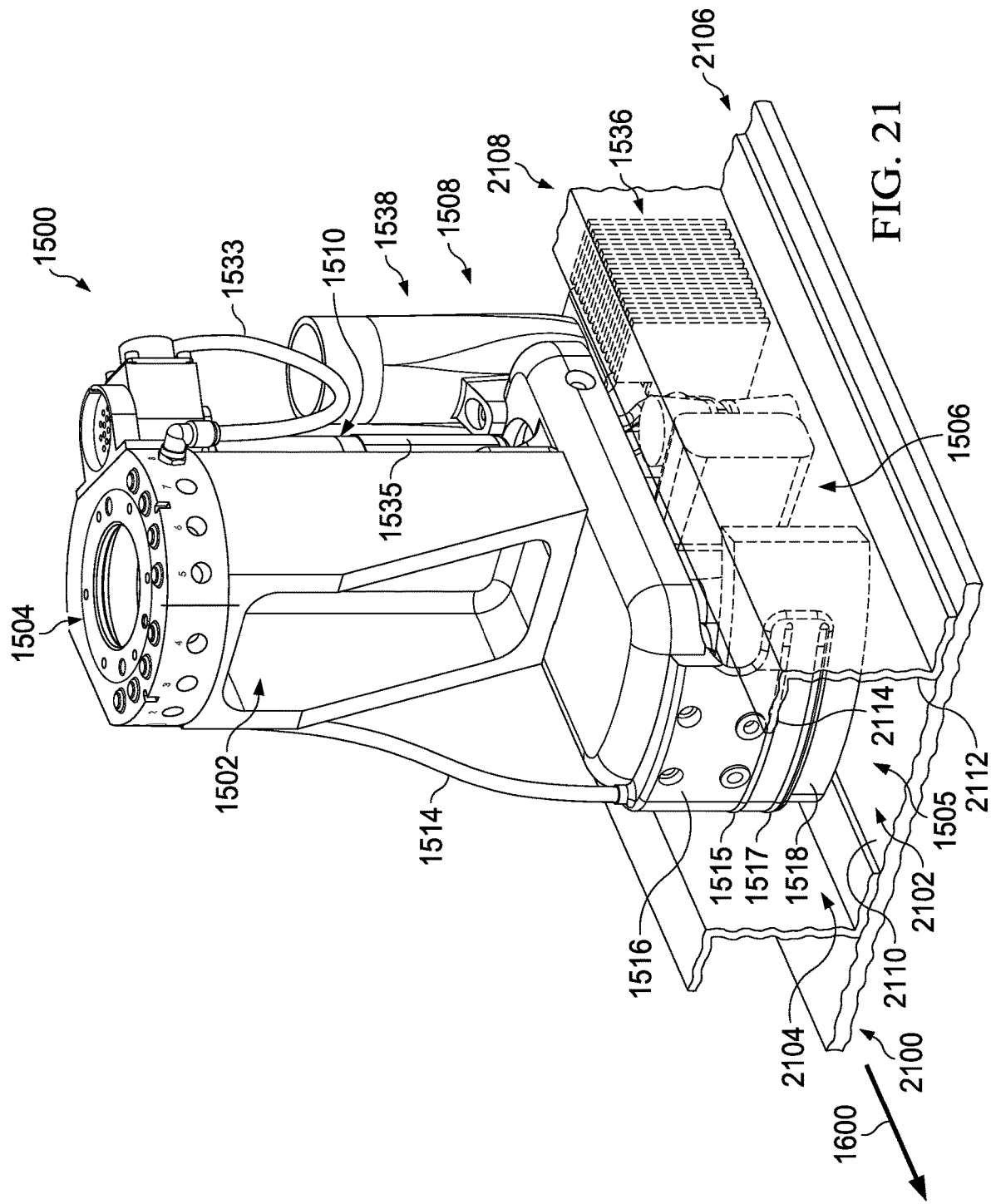
FIG. 21 is an illustration of an end effector cleaning an object in accordance with an illustrative embodiment.

Turning now to FIG. 21, an illustration of end effector 1500 from FIGS. 15-20 cleaning an object is depicted in accordance with an illustrative embodiment. In this illustrative example, end effector 1500 from FIGS. 15-20 may be positioned over object 2100. Object 2100 may be an example of one implementation for object 104 in FIG. 1.

Object 2100 may include wing panel 2102 with stringer 2104 and stringer 2106 attached to wing panel 2102. As depicted, stringer 2106 may have flange 2108. In this illustrative example, end effector 1500 may be used to clean first surface 2110 of wing panel 2102, second surface 2112 of stringer 2106, and third surface 2114 of flange 2108.

End effector 1500 may be moved in the direction of arrow 1600 from FIG. 16. In particular, a robotic device (not shown) attached to platform 1502 of end effector 1500 by robotic interface 1504 may move platform 1502 and thereby end effector 1500, in the direction of arrow 1600.

First set of brushes 1520 from FIGS. 15-20 may be used to clean first surface 2110 as platform 1502 is moved in the direction of arrow 1600. Second set of brushes 1522 from FIGS. 15-20 may be used to clean second surface 2112 as platform 1502 is moved in the direction of arrow 1600. Further, third set of brushes 1524 from FIGS. 15-20 may be used to clean third surface 2114 as platform 1502 is moved in the direction of arrow 1600.

The illustrations of end effector 500 in FIGS. 5-7, end effector 1000 in FIGS. 10-14, and end effector 1500 in FIGS. 15-19 are not meant to imply physical or architectural limitations to the manner in which an illustrative embodiment may be implemented. Other components in addition to or in place of the ones illustrated may be used. Some components may be optional.

The different components shown in FIGS. 5-21 may be illustrative examples of how components shown in block form in FIGS. 1-4 can be implemented as physical structures. Additionally, some of the components in FIGS. 5-21 may be combined with components in FIGS. 1-4, used with components in FIGS. 1-4, or a combination of the two.

Figure 22:
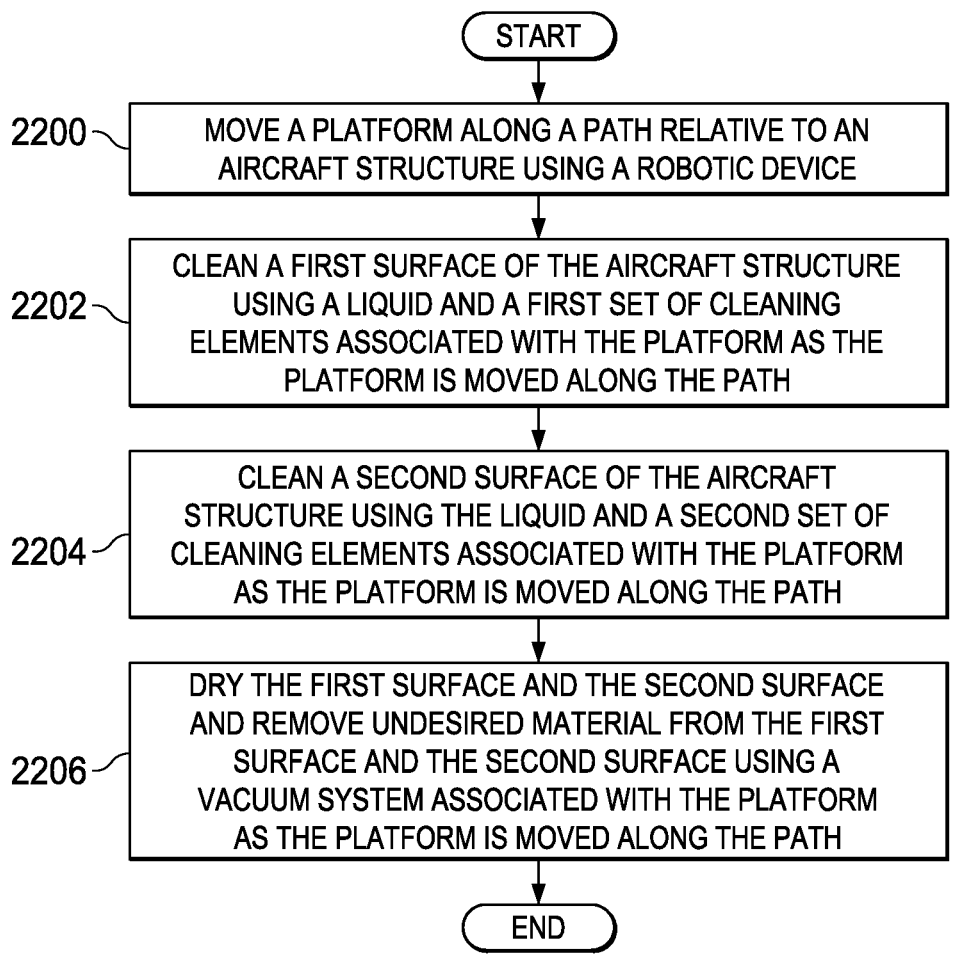
FIG. 22 is an illustration of a process for cleaning an object in the form of a flowchart in accordance with an illustrative embodiment.

With reference now to FIG. 22, an illustration of a process for cleaning an object is depicted in the form of a flowchart in accordance with an illustrative embodiment. The process illustrated in FIG. 22 may be implemented using end effector 114 described in FIG. 1.

The process may begin by moving platform 116 along path 128 relative to aircraft structure 105 using robotic device 112 (operation 2200). Next, first surface 132 of aircraft structure 105 may be cleaned using liquid 138 and first set of cleaning elements 123 associated with platform 116 as platform 116 is moved along path 128 (operation 2202). Second surface 134 of aircraft structure 105 may be cleaned using liquid 138 and second set of cleaning elements 125 associated with platform 116 as platform 116 is moved along path 128 (operation 2204).

Thereafter, first surface 132 and second surface 134 may be dried and undesired material 142 removed from first surface 132 and second surface 134 using vacuum system 124 associated with platform 116 as platform 116 is moved along path 128 (operation 2206), with the process terminating thereafter. Undesired material 142 may include any remaining liquid on plurality of surfaces 130 and other materials dislodged from plurality of surfaces 130 during the cleaning of plurality of surfaces 130. In this manner, plurality of surfaces 130 may be cleaned and dried by end effector 114 in a single pass along path 128.

Figure 23:
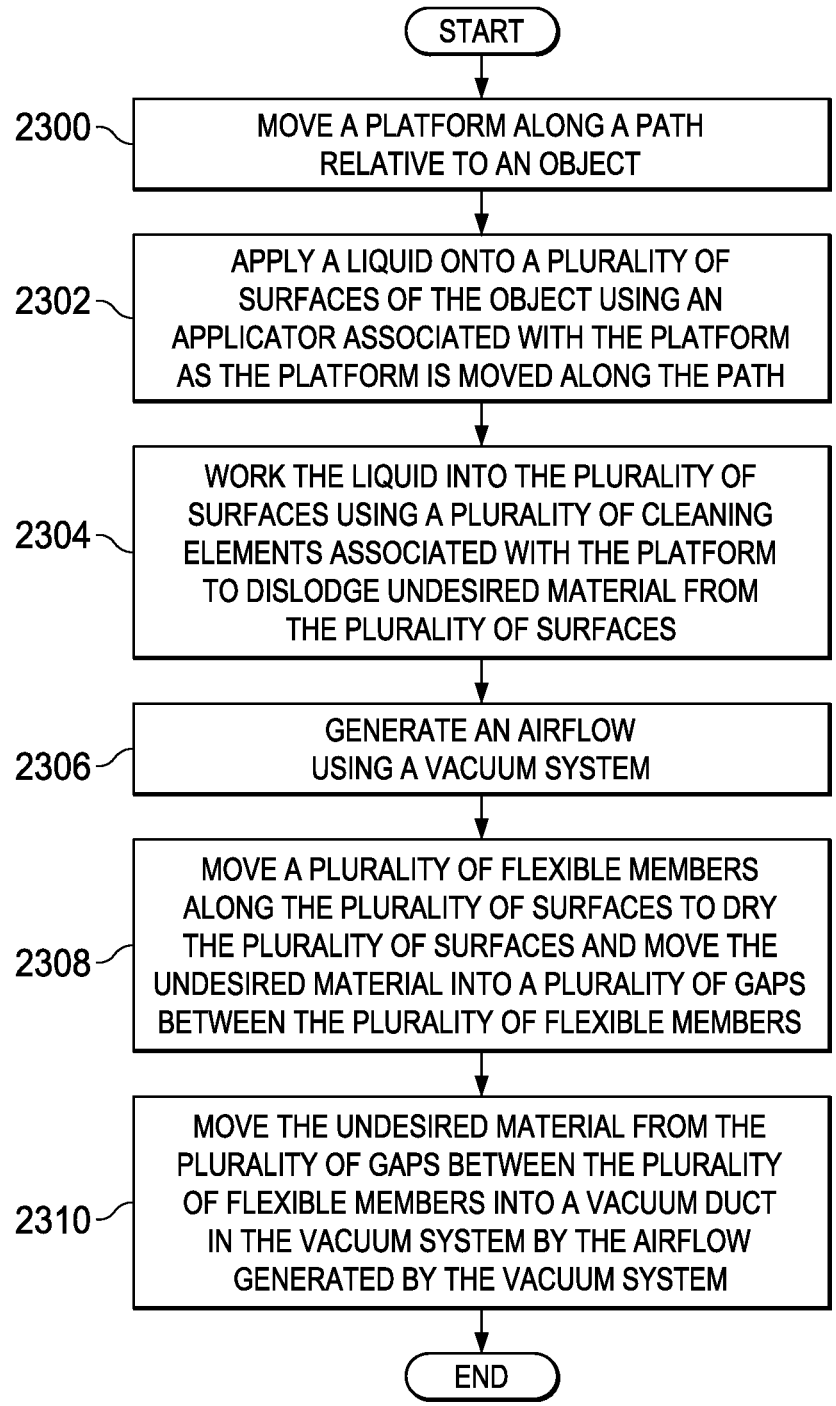
FIG. 23 is an illustration of a process for cleaning a plurality of surfaces of an object in the form of a flowchart in accordance with an illustrative embodiment.

With reference now to FIG. 23, an illustration of a process for cleaning a plurality of surfaces of an object is depicted in the form of a flowchart in accordance with an illustrative embodiment. The process illustrated in FIG. 23 may be implemented using end effector 114 described in FIG. 1, having third configuration 400 in FIG. 4.

The process may begin by moving platform 116 along path 128 relative to object 104 (operation 2300). Liquid 138 may be applied onto plurality of surfaces 130 of object 104 using applicator 404 associated with platform 116 as platform 116 is moved along path 128 (operation 2302).

Next, liquid 138 may be worked into plurality of surfaces 130 using plurality of cleaning elements 120 associated with platform 116 to dislodge undesired material 142 from plurality of surfaces 130 (operation 2304). Airflow may be generated using vacuum system 124 (operation 2306). In operation 2306, the airflow may be generated such that air may move away from plurality of cleaning elements 120 into vacuum duct 431.

Plurality of flexible members 432 may be moved along plurality of surfaces 130 to dry plurality of surfaces 130 and move undesired material 142 into plurality of gaps 434 between plurality of flexible members 432 (operation 2308). The airflow generated in operation 2306 may help plurality of flexible members 432 maintain contact with plurality of surfaces 130 as platform 116 is moved along path 128.

In particular, the vacuum pressure created by vacuum system 124 may ensure that plurality of flexible members 432 maintains sufficient contact with plurality of surfaces 130 even when passing over nonplanar portions of plurality of surfaces 130. Sufficient contact may be needed to ensure that substantially all of undesired material 142 is removed from plurality of surfaces 130.

Thereafter, undesired material 142 may be moved from plurality of gaps 434 between plurality of flexible members 432 into vacuum duct 431 in vacuum system 124 by the airflow generated by vacuum system 124 (operation 2310), with the process terminating thereafter. Thus, plurality of flexible members 432 may be moved along plurality of surfaces 130 in operation 2308 to both dry plurality of surfaces 130 and remove undesired material 142 from plurality of surfaces 130. In this manner, all of the operations involved in the cleaning of plurality of surfaces 130 may be performed a single pass of platform 116 being moved along path 128.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, a portion of an operation or step, some combination thereof.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operations 2308 and 2310 in FIG. 23 may be performed at the same time. In some illustrative examples, operations 2308 and 2310 may be omitted. In these examples, the removal of undesired material 142 described in operations 2308 and 2310 in FIG. 23 may be performed using other types of operations.

The illustrative embodiments of the disclosure may be described in the context of aircraft manufacturing and service method 2400 as shown in FIG. 24 and aircraft 2500 as shown in FIG. 25. Turning first to FIG. 24, an illustration of an aircraft manufacturing and service method is depicted in the form of a block diagram in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 may go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by at least one of a system integrator, a third party, or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of an aircraft is depicted in the form of a block diagram in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24. In particular, end effector 114 from FIG. 1 may be used to clean different types of aircraft structures during any one of the stages of aircraft manufacturing and service method 2400.

For example, without limitation, end effector 114 from FIG. 1 having first configuration 200 in FIG. 2, second configuration 300 in FIG. 3, or third configuration 400 in FIG. 4, may be used to clean an aircraft structure during at least one of component and subassembly manufacturing 2406, system integration 2408, routine maintenance and service 2414, or some other stage of aircraft manufacturing and service method 2400. End effector 114 from FIG. 1 may be used to clean, for example, without limitation, a portion of airframe 2502 of aircraft 2500, a wing panel of a wing for aircraft 2500, or some other type of aircraft structure.

In one illustrative example, components or subassemblies produced in component and subassembly manufacturing 2406 in FIG. 24 may be fabricated or manufactured in a manner similar to components or subassemblies produced while aircraft 2500 is in service 2412 in FIG. 24. As yet another example, one or more apparatus embodiments, method embodiments, or a combination thereof may be utilized during production stages, such as component and subassembly manufacturing 2406 and system integration 2408 in FIG. 24. One or more apparatus embodiments, method embodiments, or a combination thereof may be utilized while aircraft 2500 is in service 2412, during maintenance and service 2414 in FIG. 24, or both. The use of a number of the different illustrative embodiments may substantially expedite the assembly of and reduce the cost of aircraft 2500.

Thus, the illustrative embodiments provide a method and apparatus for cleaning an object having a plurality of surfaces. In one illustrative example, end effector 114 from FIG. 1 may be used to clean plurality of surfaces 130 of object 104. End effector 114 may include liquid application system 121 configured for use in applying liquid 138 onto plurality of surfaces 130. End effector 114 may also include plurality of cleaning elements 120 configured to work liquid 138 that has been applied on plurality of surfaces 130 into plurality of surfaces 130 to dislodge undesired material 142 from plurality of surfaces 130. Further, end effector 114 may also include vacuum system 124 configured for use in removing undesired material 142.

By having a single end effector configured to perform the operations described above, the overall time and effort needed to clean plurality of surfaces 130 may be significantly reduced. Further, using end effector 114 may increase the quality of cleaning performed on plurality of surfaces 130.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a platform;
   a robotic interface associated with the platform and configured for attachment to a robotic device in which the robotic device is configured to move the platform along a path relative to an aircraft structure;
   a first plurality of bristles affixed to a first base having a first center axis of rotation, the first plurality of bristles configured to clean a first surface and a second surface of the aircraft structure as the platform is moved along the path, wherein the first plurality of bristles comprises a first group and a second group, wherein the first group extends from the first base parallel to the first center axis of rotation, and wherein the second group extends from the first base perpendicular to the first center axis of rotation;
   a second plurality of bristles affixed to a second base having a second center axis of rotation, the second plurality of bristles configured to contact the first surface and the second surface of the aircraft structure as the platform is moved along the path in which the second surface is angled relative to the first surface, wherein the second plurality of bristles comprises a third group and a fourth group, wherein the third group extends from the second base parallel to the second center axis of rotation and the fourth group extends from the second base perpendicular to the second center axis of rotation; and
   a vacuum system associated with the platform and configured to dry the first surface and the second surface and remove undesired material from the first surface and the second surface as the platform is moved along the path.

2. The apparatus of claim 1 further comprising:
   a motor system configured to rotate the first plurality of bristles about the first center axis of rotation and the second plurality of bristles about the second center axis of rotation as the platform is moved along the path.

3. The apparatus of claim 2, wherein the motor system includes a number of pneumatic motors.

4. The apparatus of claim 1 further comprising:
   a number of spraying devices configured to spray a liquid towards at least one of the first plurality of bristles and the second plurality of bristles.

5. The apparatus of claim 1 further comprising:
   the first base having a first plurality of channels; and
   the second base having a second plurality of channels.

6. The apparatus of claim 5, wherein the vacuum system comprises:
   a main vacuum duct; and
   a vacuum generation system configured to generate an airflow that causes the undesired material to move through the first plurality of channels and the second plurality of channels to the main vacuum duct.

7. The apparatus of claim 6 further comprising:
   a vacuum cover, wherein the first base and the second base are associated with the vacuum cover;
   a first vacuum chamber associated with the vacuum cover, wherein the undesired material is moved through the first plurality of channels through a first opening in the vacuum cover into the first vacuum chamber and into the main vacuum duct; and
   a second vacuum chamber associated with the vacuum cover, wherein the undesired material is moved through the second plurality of channels through a second opening in the vacuum cover into the second vacuum chamber and into the main vacuum duct.

8. The apparatus of claim 1, wherein the vacuum system comprises a first vacuum cover associated with the first plurality of bristles and a second vacuum cover associated with the second plurality of bristles.

9. The apparatus of claim 8 further comprising:
first members configured to clean the first plurality of bristles; and
second members configured to clean the second plurality of bristles.

10. The apparatus of claim 9, wherein the first members are associated with the first vacuum cover such that the first members extend from the first vacuum cover toward the first center axis of rotation, and wherein the second members are associated with the second vacuum cover such that the second members extend from the second vacuum cover toward the second center axis of rotation.

11. The apparatus of claim 8 further comprising:
a first vibration damper, associated with the first vacuum cover, configured to reduce vibrations caused by rotation of the first plurality of bristles; and
a second vibration damper, associated with the second vacuum cover, configured to reduce vibrations caused by rotation of the second plurality of bristles.

12. The apparatus of claim 8, wherein the first vacuum cover contains a first opening and the second vacuum cover contains a second opening.

13. The apparatus of claim 12, wherein undesired material from the first plurality of bristles travels through the first opening in the first vacuum cover into a first duct and undesired material from the second plurality of bristles travels through the second opening in the second vacuum cover into a second duct.

14. The apparatus of claim 13, wherein the first duct and the second duct converge into a main duct.

15. The apparatus of claim 14, wherein the main duct comprises an end that is configured for attachment to a receptacle.

16. The apparatus of claim 8, wherein the first vacuum cover is separate and distinct from the second vacuum cover.

17. The apparatus of claim 1, wherein the first center axis of rotation is parallel to the second center axis of rotation, and wherein both the first center axis of rotation and the second center axis of rotation extend towards the robotic interface.

18. The apparatus of claim 1 further comprising:
a first pneumatic motor associated with the platform configured to rotate the first plurality of bristles; and
a second pneumatic motor associated with the platform configured to rotate the second plurality of bristles.

19. A method for cleaning an aircraft structure using an end effector, the method comprising:
moving a platform of the end effector along a path relative to the aircraft structure using a robotic device, the end effector attached to the robotic device by a robotic interface associated with the platform;
cleaning a first surface of the aircraft structure using a liquid and a first group of a first plurality of bristles as the platform is moved along the path, in which the first plurality of bristles is affixed to a first base having a first center axis of rotation, wherein the first group extends from the first base parallel to the first center axis of rotation, the first plurality of bristles configured to clean the first surface and a second surface of the aircraft structure as the platform is moved along the path;
cleaning the second surface of the aircraft structure using the liquid and a second group of the first plurality of bristles as the platform is moved along the path, in which the second surface is angled relative to the first surface, wherein the second group extends from the first base perpendicular to the first center axis of rotation;
contacting the first surface of the aircraft structure with a third group of a second plurality of bristles as the platform is moved along the path, in which the second plurality of bristles is affixed to a second base having a second center axis of rotation, wherein the third group extends from the second base parallel to the second center axis of rotation, the second plurality of bristles configured to contact the first surface and the second surface of the aircraft structure as the platform is moved along the path;
contacting the second surface of the aircraft structure with a fourth group of the second plurality of bristles as the platform is moved along the path, wherein the fourth group extends from the second base perpendicular to the second center axis of rotation; and
drying the first surface and the second surface and removing undesired material from the first surface and the second surface using a vacuum system associated with the platform as the platform is moved along the path.

20. The method of claim 19, wherein the aircraft structure is a wing, the first surface is of a wing panel for the wing, and the second surface is of a stringer attached to the wing.

21. The method of claim 19, wherein moving the platform along the path relative to the aircraft structure using the robotic device comprises:
moving the platform along the path such that the first group contacts the first surface while the second group contacts the second surface in which the first surface is of a wing panel and the second surface is of a stringer attached to the wing panel.

22. The method of claim 19, wherein moving the platform of the end effector along the path comprises moving the platform such that the second plurality of bristles follows the first plurality of bristles along the path.

23. The method of claim 19, wherein contacting the first surface with the third group and contacting the second surface with the fourth group comprises drying the first surface and the second surface.

* * * * *